US012663768B2

(12) United States Patent
Horton

(10) Patent No.: US 12,663,768 B2
(45) Date of Patent: Jun. 23, 2026

(54) DIGITAL TWIN-BASED SYSTEM AND METHOD FOR REDUCING PEAK POWER AND ENERGY CONSUMPTION IN A PHYSICAL SYSTEM

(71) Applicant: Dallas/Fort Worth International Airport Board, DFW Airport, TX (US)

(72) Inventor: Robert Horton, Lewisville, TX (US)

(73) Assignee: Dallas/Fort Worth International Airport Board, DFW Airport, TX (US)

( * ) Notice: Subject to any disclaimer, the term of this patent is extended or adjusted under 35 U.S.C. 154(b) by 85 days.

(21) Appl. No.: 18/467,569

(22) Filed: Sep. 14, 2023

(65) Prior Publication Data

US 2024/0096226 A1 Mar. 21, 2024

Related U.S. Application Data

(60) Provisional application No. 63/376,988, filed on Sep. 23, 2022, provisional application No. 63/375,828, filed on Sep. 15, 2022.

(51) Int. Cl.
| | |
|---|---|
| *G05B 13/04* | (2006.01) |
| *G01C 21/34* | (2006.01) |
| *G01C 21/36* | (2006.01) |
| *G08G 9/00* | (2006.01) |

(52) U.S. Cl.
CPC ....... *G05B 13/048* (2013.01); *G01C 21/3492* (2013.01); *G01C 21/3694* (2013.01); *G08G 9/00* (2013.01)

(58) Field of Classification Search
CPC .............. G05B 13/048; G01C 21/3492; G01C 21/3694; G08G 9/00
USPC ........................................................ 701/425
See application file for complete search history.

(56) References Cited

U.S. PATENT DOCUMENTS

| | | | |
|---|---|---|---|
| 6,718,779 | B1 | 4/2004 | Henry |
| 8,090,532 | B2 * | 1/2012 | Tashev ............... G01C 21/3461 |
| | | | 340/991 |
| 9,002,532 | B2 | 4/2015 | Asmus |
| 10,101,731 | B2 | 10/2018 | Asmus et al. |

(Continued)

OTHER PUBLICATIONS

C. T. Barba, M. Á. Mateos, P. R. Soto, A. M. Mezher and M. A. Igartua, "Smart city for VANETs using warning messages, traffic statistics and intelligent traffic lights," 2012 IEEE Intelligent Vehicles Symposium, Madrid, Spain, 2012, pp. 902-907, doi: 10.1109/IVS. 2012.6232229. (Year: 2012).*

(Continued)

*Primary Examiner* — Tiffany P Young
*Assistant Examiner* — Merritt E Levy

(57) ABSTRACT

A method includes identifying a route for passengers seeking to enter a building. The route includes at least one section of road for automobiles to access a building; or at least one access point inside the building for pedestrians to pass through. The method includes receiving traffic flow information corresponding to the route. The method includes determining whether the received traffic flow information corresponds to a condition that impedes the route, from among a set of pre-trained conditions. The method includes identifying and displaying a list of user-selectable state alternatives related to the condition that impedes the route, based on a determination that the received traffic flow information corresponds to the condition.

21 Claims, 21 Drawing Sheets

(56) References Cited

U.S. PATENT DOCUMENTS

| | | | |
|---|---|---|---|
| 10,732,584 | B2 | 8/2020 | ElBsat et al. |
| 10,761,547 | B2 | 9/2020 | Risbeck et al. |
| 10,996,641 | B2 | 5/2021 | Yan et al. |
| 11,047,586 | B2 | 6/2021 | Hoff |
| 2005/0021227 | A1* | 1/2005 | Matsumoto ........ G01C 21/3415 701/431 |
| 2007/0272493 | A1* | 11/2007 | Legez ........................ B66B 1/20 700/13 |
| 2009/0157302 | A1* | 6/2009 | Tashev ............... G01C 21/3461 705/14.69 |
| 2013/0013121 | A1 | 1/2013 | Henze et al. |
| 2013/0297387 | A1* | 11/2013 | Michael ................. G06Q 30/02 705/13 |
| 2014/0166261 | A1 | 6/2014 | Suzuki et al. |
| 2015/0134244 | A1 | 5/2015 | Hershey et al. |
| 2016/0047578 | A1 | 2/2016 | Warren |
| 2016/0327295 | A1 | 11/2016 | Ward et al. |
| 2016/0334236 | A1* | 11/2016 | Mason ............... G01C 21/3461 |
| 2017/0069209 | A1* | 3/2017 | Beaurepaire ........... G08G 1/091 |
| 2017/0292851 | A1* | 10/2017 | Chen ...................... G06Q 50/40 |
| 2017/0374530 | A1* | 12/2017 | Ramasamy ............ G08G 1/207 |
| 2018/0018572 | A1 | 1/2018 | Wang et al. |
| 2018/0211541 | A1* | 7/2018 | Rakah .................. G06Q 10/047 |
| 2019/0295007 | A1 | 9/2019 | Shimode et al. |
| 2019/0332072 | A1 | 10/2019 | Beaty et al. |
| 2019/0353493 | A1* | 11/2019 | Takahashi ............ G06V 20/584 |
| 2021/0003308 | A1 | 1/2021 | Venne |
| 2021/0041253 | A1* | 2/2021 | Walpuck .................. G08G 1/09 |
| 2021/0063983 | A1 | 3/2021 | Anderson et al. |
| 2021/0296897 | A1 | 9/2021 | Cruickshank, III |
| 2021/0381861 | A1 | 12/2021 | Brown et al. |
| 2022/0187028 | A1 | 6/2022 | Ben Nun et al. |
| 2022/0373206 | A1 | 11/2022 | Tillack |
| 2024/0177536 | A9* | 5/2024 | Cella ...................... G06N 20/00 |

OTHER PUBLICATIONS

Nel Samama, "Maps," in Indoor Positioning: Technologies and Performance , IEEE, 2019, pp. 295-310, doi: 10.1002/9781119421887.ch13. (Year: 2019).*

P. Siriaraya et al., "Beyond the Shortest Route: A Survey on Quality-Aware Route Navigation for Pedestrians," in IEEE Access, vol. 8, pp. 135569-135590, 2020, doi: 10.1109/ACCESS.2020.3011924. (Year: 2020).*

M. Arikawa, S. Konomi and K. Ohnishi, "Navitime: Supporting Pedestrian Navigation in the Real World," in IEEE Pervasive Computing, vol. 6, No. 3, pp. 21-29, Jul.-Sep. 2007, doi: 10.1109/MPRV.2007.61. (Year: 2007).*

J. Zheng, A. Winstanley, Z. Pan and S. Coveney, "Spatial Characteristics of Walking Areas for Pedestrian Navigation," 2009 Third International Conference on Multimedia and Ubiquitous Engineering, Qingdao, China, 2009, pp. 452-458, doi: 10.1109/MUE.2009.80. (Year: 2009).*

Ugirumurera, J. et al., "A modeling framework for designing an evaluating curbside traffic management policies at Dallas-Fort Worth International Airport," Transportation Research Part A: Policy and Practice, vol. 153, Nov. 2021, pp. 130-150, 31 pages.

Sigler, D. et al., "Route optimization for energy efficient airport shuttle operations—A case study from Dallas Fort worth International Airport," Journal of Air Transport Management, vol. 94, Jul. 2021, 28 pages.

Sigler, D. et al., "Airport Infrastructure Planning Using Multi-stage Stochastic Programming," Oct. 2021, retrived from URL <https://www.nrel.gov/docs/fy23osti/80951.pdf>, 39 pages.

Lunacek, M. et al., "A data-driven operational model for traffic at the Dallas Fort Worth International Airport," Journal of Transport Management, vol. 94, Jul. 2021, 20 pages.

Wang, Q. et al., "ASPIRES: Airport Shuttle Planning and Improved Routing Event-driven Simulation," Transportation Research Record: Journal of the Transportation Research Board, vol. 2676, Issue 12, Jun. 2022, 11 pages.

Liu, Z. et al., "Data-driven simulation-based planning for electric airport shuttle systems: A real-world case study," Applied Energy, vol. 332, Feb. 2023, 56 pages.

Slgler, D. et al., "Transportation Hub Infrastructure Expansion: Decision Support Under Uncertainty," Aug. 2021, retrieved from URL <https://www.nrel.gov/docs/fy21osti/80637.pdf>, 89 pages.

Ge, Y. et al., "Joint Modeling of Access Mode and Parking Choice of Air Travelers Using Revealed Preference Data," Transportation Research Record: Journal of the Transportation Research Board, vol. 2675, Issue 11, Jul. 2021, 25 pages.

National Renewal Energy Laboratory, "Athena: wisdom to guide mobility transformations at U.S. ports (overview)," Feb. 2020, retrieved from URL <https://www.nrel.gov/docs/fy20osti/75902.pdf>, 2 pages.

National Renewal Energy Laboratory, "Optimization and Electrification of Airport Shuttle Bus Fleets," Sep. 2020, retrieved from URL <https://www.nrel.gov/docs/fy20osti/77601.pdf>, 1 page.

National Renewal Energy Laboratory, "Airport Traffic Management and Planning Frameworks," Sep. 2020, retrieved from URL <https://www.nrel.gov/docs/fy20osti/77629.pdf>, 1 page.

National Renewal Energy Laboratory, "Airport Surface Transportation Digital Twin Framework," Sep. 2020, retrieved from URL <https://www.nrel.gov/docs/fy20osti/77602.pdf>, 1 page.

Chinde, V. et al., "Model predictive control for optimal dispatch of chillers and thermal energy storage tank in airports," Energy and Buildings, vol. 311, May 2024, 12 pages.

International Search Report and Written Opinion of the International Searching Authority dated Nov. 30, 2023, in connection with International Application No. PCT/US2023/032769, 22 pages.

International Search Report and Written Opinion of the International Searching Authority dated Dec. 19, 2023, in connection with International Application No. PCT/US2023/032785, 6 pages.

Aw, J. "Letter to the Editor: The non-contact handheld cutaneous infra-red thermometer for fever screening during the COVID-19 global emergency," Journal of Hospital Infection, 104(4), Apr. 2020, 1 page.

Childs, C. et al., "Infra-red thermal imaging of the inner canthus: correlates with the temperature of the injured human brain," Engineering, 4(10B):53-56, Oct. 2012, 4 pages.

Gostic, K. et al., "Estimated effectiveness of symptom and risk screening to prevent the spread of COVID-19," Elife, 9: e55570, Feb. 2020, 18 pages.

Ghassemi, P. et al., "Best practices for standardized performance testing of infrared thermographs intended for fever screening," PloS one, 13(9):e0203302, Sep. 2018, 24 pages.

Klepeis, N. et al., "The National Human Activity Pattern Survey (NHAPS): A Resource for Assessing Exposure to Environmental Pollutants," Journal for Exposure Science & Environmental Epidemiology, 11(3):231-252, Jul. 2001, 41 pages.

Nguyen A.V. et al., "Comparison of 3 Infrared Thermal Detection Systems and Self-Report for Mass Fever Screening. Emerging Infectious Diseases," 16(11):1710-1717, Nov. 2010, 8 pages.

Teunissen, L.P.J. et la., "Infrared thermal imaging of the inner canthus of the eye as an estimator of body core temperature,": Journal of Medical Engineering & Technology, 35(3-4):134-138, Apr. 2011, 6 pages.

Wilhelmi, J., "Airport Roles in Reducing Transmission of Communicable Diseases: Summary of a Workshop of the Airport Cooperative Research Program's 2018 Insight Event," Transportation Research Board Conference Proceedings, No. 55, 2019, 67 pages.

World Health Organization (WHO), "Naming the coronavirus disease (COVID-19) and the virus that causes it," 2023, URL <https://www.who.int/emergencies/diseases/novel-coronavirus-2019/technical-guidance/naming-the-coronavirus-disease-(covid-2019)-and-the-virus-that-causes-it>, 4 pages.

Allam, Z., et al., "Artificial Intelligence (A.I.) provided early detection of the coronavirus (COVID-19) in China and will influence future Urban health policy internationally," A.I., 1(2):156-165, Apr. 2020, 10 pages.

Appold, S., et al., "The Airport City Phenomenon: Evidence from Large US Airports," Urban Studies, 50(6):1239-1259, 2013, 21 pages.

(56)                References Cited

OTHER PUBLICATIONS

Bodin, O., et al., "Improving network approaches to the study of complex social-ecological interdependencies," Nature Sustainability, 2(7):551-559, Jul. 2019, 21 pages.

De Leeuw, E., et al., "Healthy Airports," Sydney: Center for Health Equity Training, Research and Evaluation (CHETRE), Feb. 2018, 22 pages.

DFW Airport, "Sustainability Management Plan. DFW Airport: Dallas-Fort Worth International Airport," 2014, 98 pages.

Doss-Gollin, J., et al. "How unprecedented was the Feb. 2021 Texas cold snap?" Environmental Research Letters, 16(6):064056, Jun. 2021, 8 pages.

Fox-Lent, C., et al., "A matrix approach to community resilience assessment: an illustrative case at Rockaway Peninsula," Environment Systems and Decisions, 35:209-218, Jun. 2015, 10 pages.

Henao, A., et al., "Airport analyses informing new mobility shifts: Opportunities to adapt energy-efficient mobility services and infrastructure," Intelligent Transportation Society of America, 2018 Annual Meeting, Jun. 2018, 8 pages.

Kapur, A. "Airport infrastructure: The emerging role of the private sector," The World Bank Technical Paper No. 313, Dec. 1995, 100 pages.

Kelemen, Z., "Possible Solution of the Airport Information System Integration," Periodica Polytechnica Transportation Engineering, 32(1-2):57-64, Dec. 2004, 8 pages.

Kiker, G., et al., "Application of Multicriteria Decision Analysis in Environmental Decision Making," Integrated Environmental Assessment and Management, 1(2):95-108, Apr. 2005, 14 pages.

Linkov, I., et al., "Measurable Resilience for Actionable Policy," Environmental Science & Technology, 47(18): 10108-10110, Sep. 2013, 3 pages.

Liu, J., et al., "Complexity of Coupled Human and Natural Systems," Science, 317(5844): 1513-1516, Sep. 2007, 5 pages.

Marcotullio, P., et al., "What is a city? An essential definition for sustainability," Urbanization and Sustainability: Linking Urban Ecology, Environmental Justice and Global Environmental Change, 2013, pp. 11-25, Springer, 20 pages.

Miller, B., et al., U.S. Airport Infrastructure Funding and Financing: Issues and Policy Options Pursuant to Section 122 of the 2018 Federal Aviation Administration Reauthorization Act (No. RR-3175). Rand Corporation, Santa Monica, CA, 215 pages.

Neubauer, K., et al., A Guidebook for Safety Risk Management for Airports. ACRP Report 131, Transportation Research Board, 2015, 211 pages.

National Weather Service, "Significant North Texas Snow and Ice Events," Retrieved Mar. 28, 2021, from https:// www.weather.gov/ fwd/dsnows, 4 pages.

Ramaswami, A., et al., "A social-ecological-infrastructural systems framework for interdisciplinary study of sustainable city systems: An integrative curriculum across seven major disciplines," Journal of Industrial Ecology, 16(6): 801-813, Dec. 2012, 13 pages.

Raymond, C., et al., "Understanding and managing connected extreme events," Nature Climate Change, 10(7): 611-621, Jun. 2020, 11 pages.

Ryerson, M., et al., "A drive for better air service: How air service imbalances across neighboring regions integrate air and highway demands," Transportation Research Part A: Policy and Practice, 114:237-255, 2018, 53 pages.

Schwartz, H., et al., "Chapter 5—Transportation," Climate Change Impacts in the United States: The Third National Climate Assessment, 2014, Retrieved Mar. 27, 2021, from https://nca2014.globalchange.gov/report/sectors/transportation, 20 pages.

Sharifi, A., et al., "Chapter 1: Resilience-oriented urban planning," Resilience-oriented urban planning: Theoretical and empirical insights, 2018, 3-27, Springer, 25 pages.

Sneddon, C., et al., "Sustainable development in a post-Brundtland world," Ecological economics, 57(2): 253-268, May 2006, 16 pages.

Texas Commission on Environmental Quality, Dallas-Fort Worth: Ozone History. Retrieved Mar. 28, 2021, from https://www.tceq.texas.gov/airquality/sip/dfw/dfw-ozone-history, 2019, 9 pages.

Vespa, J., et al., "Demographic turning points for the United States: Population projections for 2020 to 2060," Washington, DC: U.S. Department of Commerce, Economics and Statistics Administration, U.S. Census Bureau, Mar. 2018, 15 pages.

Young, A., "Chapter 7: Urbanization, Environmental Justice, and Social-Environmental Vulnerability in Brazil," Urbanization and Sustainability: Linking Urban Ecology, Environmental Justice and Global Environmental Change, 95-116, 2013, Springer, 22 pages.

Allan, R., et al., "IPCC, 2021: summary for Policymakers," Climate Change 2021: The Physical Science Basis. Contribution of Working Group I to the Sixth Assessment Report of the Intergovernmental Panel on Climate Change, 2021, 3-32, 40 pages.

Bruneau, M., et al., "A framework to quantitatively assess and enhance the seismic resilience of communities." Earthquake Spectra 19(4):733-752, 15 pages.

Chen, C.C., et al., From modularity to emergence: a primer on the design and science of complex systems, Technical Report CUED/C-EDC/TR.166, University of Cambridge, Engineering Design Centre, Department of Engineering, 2016, 35 pages.

Comes, T., et al., "Critical airport infrastructure disaster resilience: A framework and simulation model for rapid adaptation," Journal of Management in Engineering, 36(5):04020059, 2020, 19 pages.

Horton, R., et al., "International airports as agents of resilience," Journal of Contingencies and Crisis Management, 30(2):217-221, Feb. 2022, 5 pages.

Tainter, J., "Social complexity and sustainability," Ecological complexity, 3(2):91-103, Jun. 2006, 13 pages.

Trauer, J., et al., "What is a Digital Twin?—Definitions and Insights from an Industrial Case Study in Technical Product Development," Proceedings of the Design Society: Design Conference, vol. 1, Cambridge University Press, 757-766, May 2020, 10 pages.

Non-final Office Action dated Nov. 12, 2025, in connection with U.S. Appl. No. 18/467,519, 11 pages.

* cited by examiner

900

Without policy

704r

704r

704r

704r

704r

704r

Simulated Origins and Destinations

Domestic Passengers Originating at DFW by Destination -- Wednesday in January

FIG. 11E

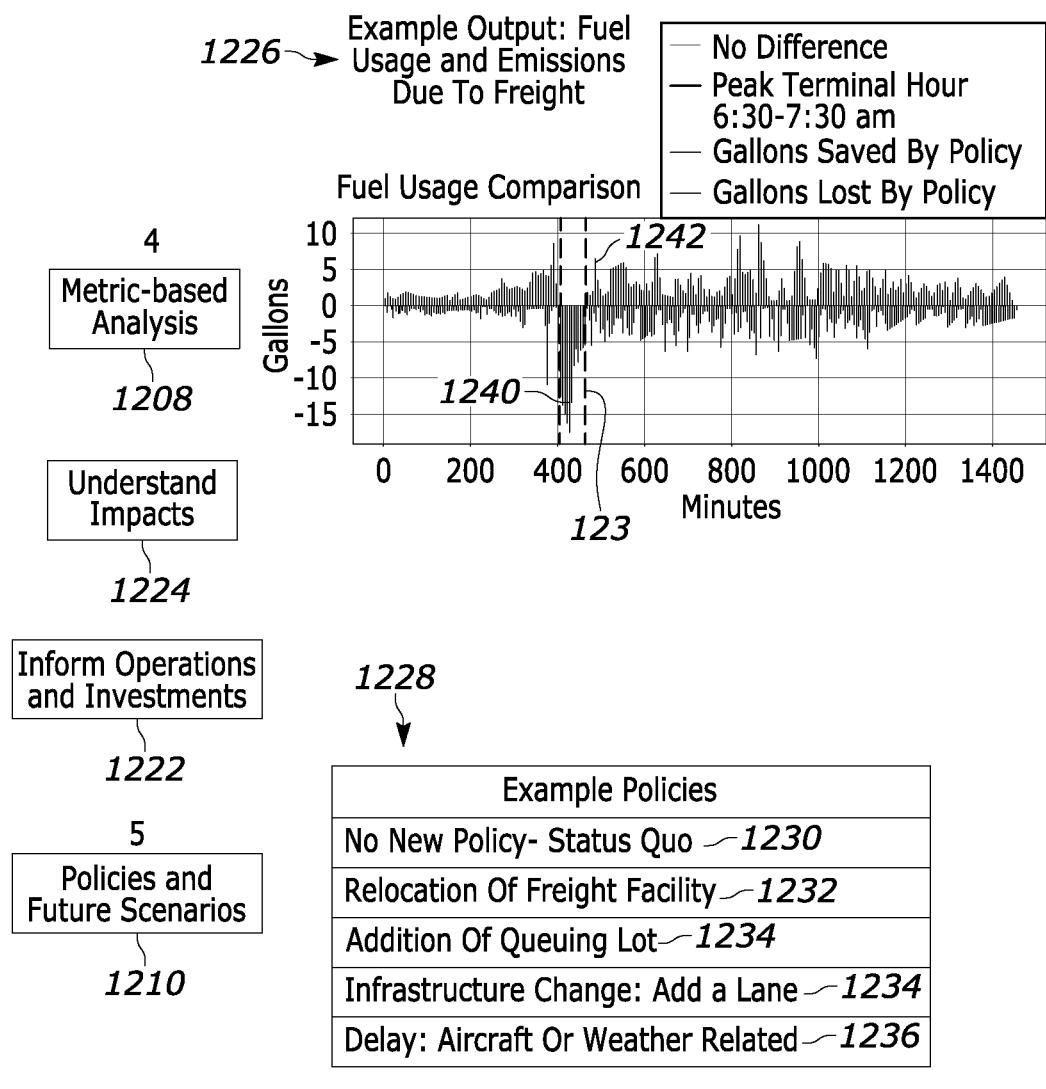

1226 → Example Output: Fuel Usage and Emissions Due To Freight

Legend:
- No Difference
- Peak Terminal Hour 6:30-7:30 am
- Gallons Saved By Policy
- Gallons Lost By Policy Fuel Usage Comparison

1242

1240

123

4
Metric-based Analysis
1208

Understand Impacts
1224

Inform Operations and Investments
1222

5
Policies and Future Scenarios
1210

1228

| Example Policies |
| --- |
| No New Policy- Status Quo — 1230 |
| Relocation Of Freight Facility — 1232 |
| Addition Of Queuing Lot — 1234 |
| Infrastructure Change: Add a Lane — 1234 |
| Delay: Aircraft Or Weather Related — 1236 |

FIG. 12B

DIGITAL TWIN-BASED SYSTEM AND METHOD FOR REDUCING PEAK POWER AND ENERGY CONSUMPTION IN A PHYSICAL SYSTEM

CROSS-REFERENCE TO RELATED APPLICATION(S) AND CLAIM OF PRIORITY

This application claims the benefit of the filing date of U.S. Provisional Patent Application No. 63/375,828 filed on Sep. 15, 2022, and U.S. Provisional Patent Application No. 63/376,988 filed on Sep. 23, 2022. The above-identified provisional patent applications are hereby incorporated by reference in their entireties. This application contains some subject matter in common with, but is otherwise unrelated to, concurrently filed United States Patent Application entitled "Digital Twin-based System and Method for Operational Control of a Physical System," application Ser. No. 18/467,519, which is hereby incorporated herein by reference in its entirety.

TECHNICAL FIELD

This disclosure generally relates to management and control of a system. More specifically, this disclosure relates to a digital twin-based system and method for reducing peak power and energy consumption in a physical system.

BACKGROUND

Modern society increasingly relies upon complex and interconnected infrastructure to function in a manner that enables sustained growth. When this infrastructure performs well and meets service delivery requirements, societal activity can continue in a manner consistent with policy incentives, goals, and needs. Conversely, when such infrastructure struggles to meet service requirements because of external stressors and disruptions or deterioration, the implications to societal wellbeing can be vast. System-level disruptions involving this infrastructure can cause various negative consequences, including: economic losses, damaged human health, reduced societal trust, reduced societal cohesion, or hazardous environmental implications. Of great concern are situations in which infrastructure disruption contributes to cascading systemic failure and situations in which disruptions to infrastructure percolate through society causing devastating and potentially irreversible outcomes. For example, in February 2021, Winter Storm Uri brought frigid temperatures (particularly, eight days of below freezing temperatures) to a widespread geographical area across the North American continent, including parts of Canada, the United States of America, and northern parts of Mexico. During Winter Storm Uri, cascading failures of interdependent infrastructure systems within the electrical grid within Texas deprived millions of people of heat and electricity for an extended period.

Historically, as a solution to safeguard infrastructure from system-level disruptions, various stakeholders utilize a risk assessment approach that is to: characterize threats, evaluate vulnerabilities, and identify direct and indirect (or unintended) consequences associated with disruption. Unfortunately, for modern infrastructure, many threats (for example, human pathogens or regional extreme weather events) are difficult to anticipate.

SUMMARY

This disclosure provides a digital twin-based system and a method for predicting traffic flow information based on a selected alternative for redirection of the traffic flow in a physical system, and a method for predicting a delayed departure of a transport vehicle based on traffic flow information in the physical system.

In a first embodiment a digital twin-based system and a method for predicting traffic flow information based on a selected alternative for redirection of the traffic flow in a physical system is provided. The method includes identifying a route for passengers seeking to enter a building. The route includes at least one section of road for automobiles to access a building; or at least one access point inside the building for pedestrians to pass through. The method includes receiving traffic flow information corresponding to the route. The method includes determining whether the received traffic flow information corresponds to a condition that impedes the route, from among a set of pre-trained conditions. The method includes identifying and displaying a list of user-selectable state alternatives related to the condition that impedes the route, based on a determination that the received traffic flow information corresponds to the condition.

In a second embodiment, an electronic device supporting a digital twin-based system and a method for predicting traffic flow information based on a selected alternative for redirection of the traffic flow in a physical system in a physical system is provided. The electronic device includes at least one processor configured to identify a route for passengers seeking to enter a building. The route includes at least one section of road for automobiles to access a building; or at least one access point inside the building for pedestrians to pass through. The at least one processor is configured to receive traffic flow information corresponding to the route. The at least one processor is configured to determine whether the received traffic flow information corresponds to a condition that impedes the route, from among a set of pre-trained conditions. The at least one processor is configured to identify and display a list of user-selectable state alternatives related to the condition that impedes the route, based on a determination that the received traffic flow information corresponds to the condition.

In a third embodiment, a non-transitory computer readable medium containing instructions that, when executed, cause at least one processor to support a digital twin-based system and a method for predicting traffic flow information based on a selected alternative for redirection of the traffic flow in a physical system in a physical system is provided. The computer program includes computer readable program code that, when executed by a processor of an electronic device, causes the electronic device to identify a route for passengers seeking to enter a building. The route includes at least one section of road for automobiles to access a building; or at least one access point inside the building for pedestrians to pass through. The computer readable program code causes the electronic device to receive traffic flow information corresponding to the route. The computer readable program code causes the electronic device to determine whether the received traffic flow information corresponds to a condition that impedes the route, from among a set of pre-trained conditions. The computer readable program code causes the electronic device to identify and display a list of user-selectable state alternatives related to the condition that impedes the route, based on a determination that the received traffic flow information corresponds to the condition.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which:

FIG. 11E illustrates multiple shuttle bus routes for route modification, according to embodiments of this disclosure;

4

DETAILED DESCRIPTION

FIGS. 1 through 14, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
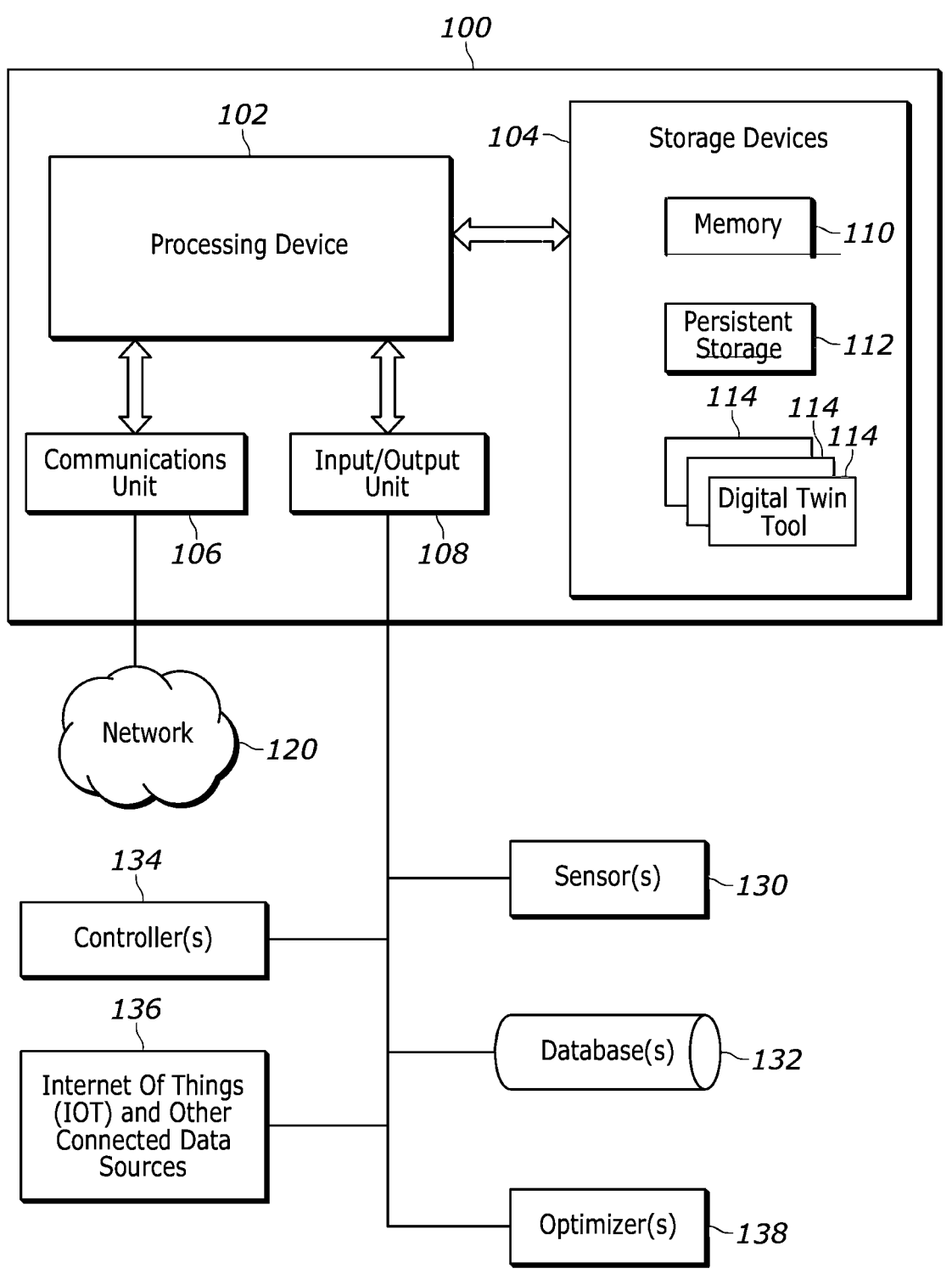
FIG. 1 illustrates an example electronic device supporting a digital twin-based system and method for reducing peak power and energy consumption in a physical system according to this disclosure.

FIG. 1 illustrates an example electronic device 100 supporting a digital twin-based system and method for reducing peak power and energy consumption in a physical system according to this disclosure. The embodiment of the electronic device 100 shown in FIG. 1 is for illustration only. Other embodiments could be used without departing from the scope of the present disclosure. The electronic device 100 of FIG. 1 may, for example, be used in the digital twin-based system 200 of FIG. 2 to interact with and control the operation of one or more physical systems 202, 204, 206.

As shown in FIG. 1, the electronic device 100 includes at least one processing device 102, at least one storage device 104, at least one communications unit 106, and at least one input/output (I/O) unit 108. The processing device 102 may execute instructions that can be loaded into a memory 110. The processing device 102 includes any suitable number(s) and type(s) of processors or other processing devices in any suitable arrangement. Example types of processing devices 102 include one or more microprocessors, microcontrollers, digital signal processors (DSPs), application specific integrated circuits (ASICs), field programmable gate arrays (FPGAs), or discrete circuitry. In some embodiments, the processing device 102 is a programmable logic controller (PLC) having user-selectable parameters.

The memory 110 and a persistent storage 112 are examples of storage devices 104, which represent any structure(s) capable of storing and facilitating retrieval of information (such as data, program code, and/or other suitable information on a temporary or permanent basis). The memory 110 may represent a random access memory or any other suitable volatile or non-volatile storage device(s). The persistent storage 112 may contain one or more components or devices supporting longer-term storage of data, such as a read only memory, hard drive, Flash memory, or optical disc. The storage devices 104 store at least one digital twin tool 114 (simply referred to as "digital twin" of "DT") of a physical system, and details about the DT 114 are described below throughout this disclosure. In certain embodiments, the at least one DT 114 includes multiple DT 114, each of a different physical system. In certain embodiments, the DT 114 is a software platform executed on a group of servers.

The communications unit 106 supports communications with other systems or devices. For example, the communications unit 106 may support communications with external systems that provide information to the electronic device 100 for use in processing nuts, such as automated tempering of nuts. The communications unit 106 may support communications through any suitable physical or wireless communication link(s), such as a network or dedicated connection(s). For example, the communications unit 106 may be controlled by the processing device 102 to receive performance measurements, such as performance measurements that are from various components associated with the physical systems of FIG. 2. The various components associated with the physical systems of FIG. 2 may be communicably coupled to communications unit 106 via the network 120.

The performance measurements received at the communications unit 106 are input to the DT 114.

The I/O unit 108 allows for input and output of data. For example, the I/O unit 108 may provide a connection for user input through a keyboard, mouse, keypad, touchscreen, or other suitable input device. The I/O unit 108 may also send output to a display or other suitable output device. The I/O unit 108 can further support communications with various components of the digital twin-based system 200 of FIG. 2. For example, input data and output data of I/O unit 108 can be received from or output to one or more sensors 130, and one or more databases 132, one or more controllers 134 of a physical component or IoT and other connected data sources 136 within the digital twin-based system 200 of FIG. 2. Each of the sensors 130 can have a sensor identifier (ID) stored in the databases 132 that link the sensor ID to a location where the sensor is installed and to a sensor detection location where the sensor detects phenomena. In the databases 132, each of the controllers 134 can have an ID linked to an ID of the physical component controlled by the controller.

The input data and output data of I/O unit 108 can also be received from or output to one or more optimizers 138, and details about the optimizers 138 are described further with FIGS. 8-14. The optimizers 138 may be triggered by the processing device 102 to activate and process data that the I/O unit 108 sends from the DT 114 to the optimizer 138. For example, the I/O unit 108 is operably connected to the optimizers 138 that are implemented on another electronic device 101, such as a local server part of the same server system. In some embodiments, the optimizers 138 can be stored on the storage devices 104, and are executed by (or controlled by) the processing device 102. In some embodiments, the optimizers 138 can be implemented on an external electronic device (e.g., an external system of servers) that is communicably coupled to the communications unit 106 via the network 120.

Although FIG. 1 illustrates one example of an electronic device 100, various changes may be made to FIG. 1. For example, computing devices and systems come in a wide variety of configurations, and FIG. 1 does not limit this disclosure to any particular computing or communication device or system.

Figure 2:
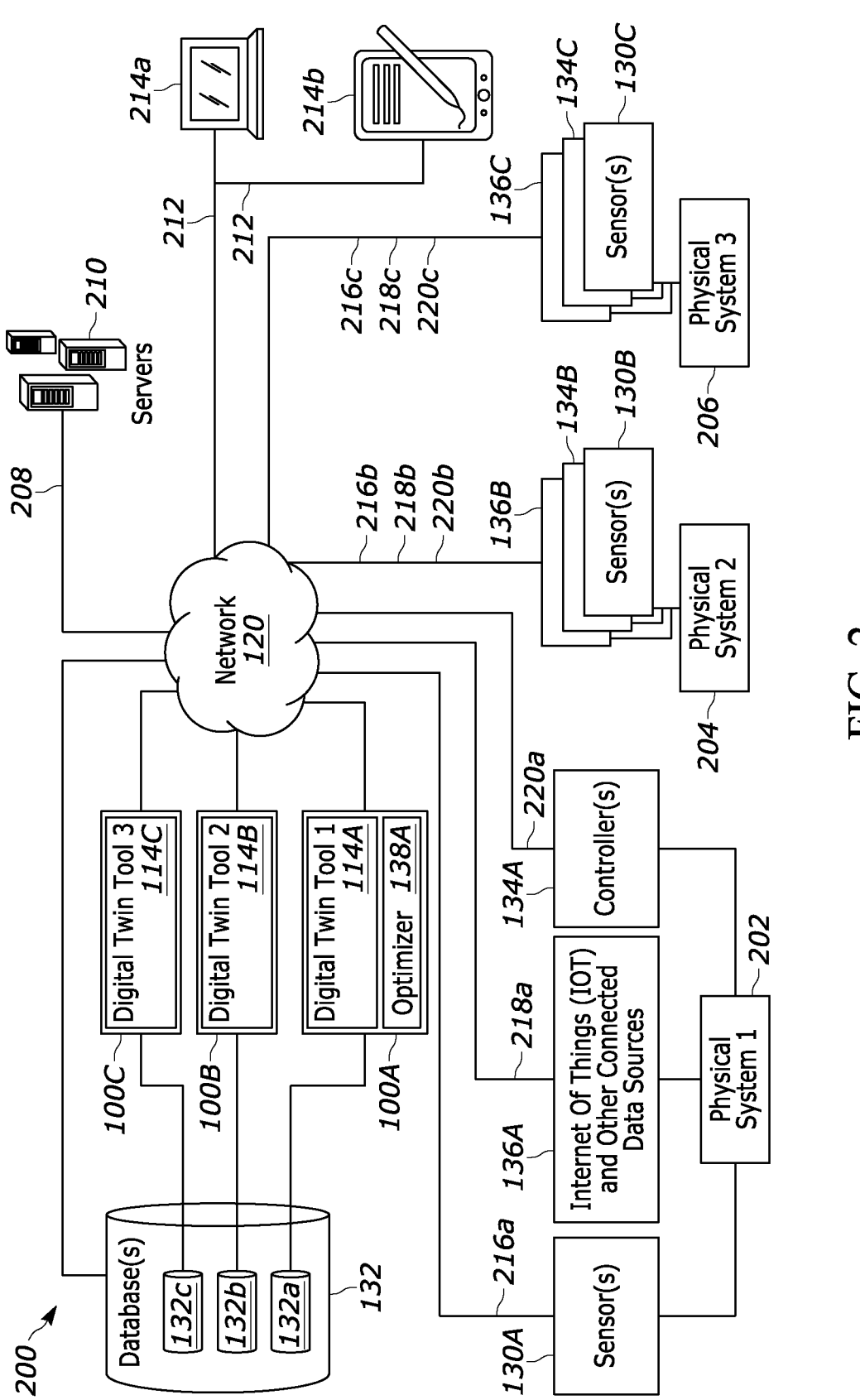
FIG. 2 illustrates an example of the digital twin-based system according to this disclosure.
Figure 12A:
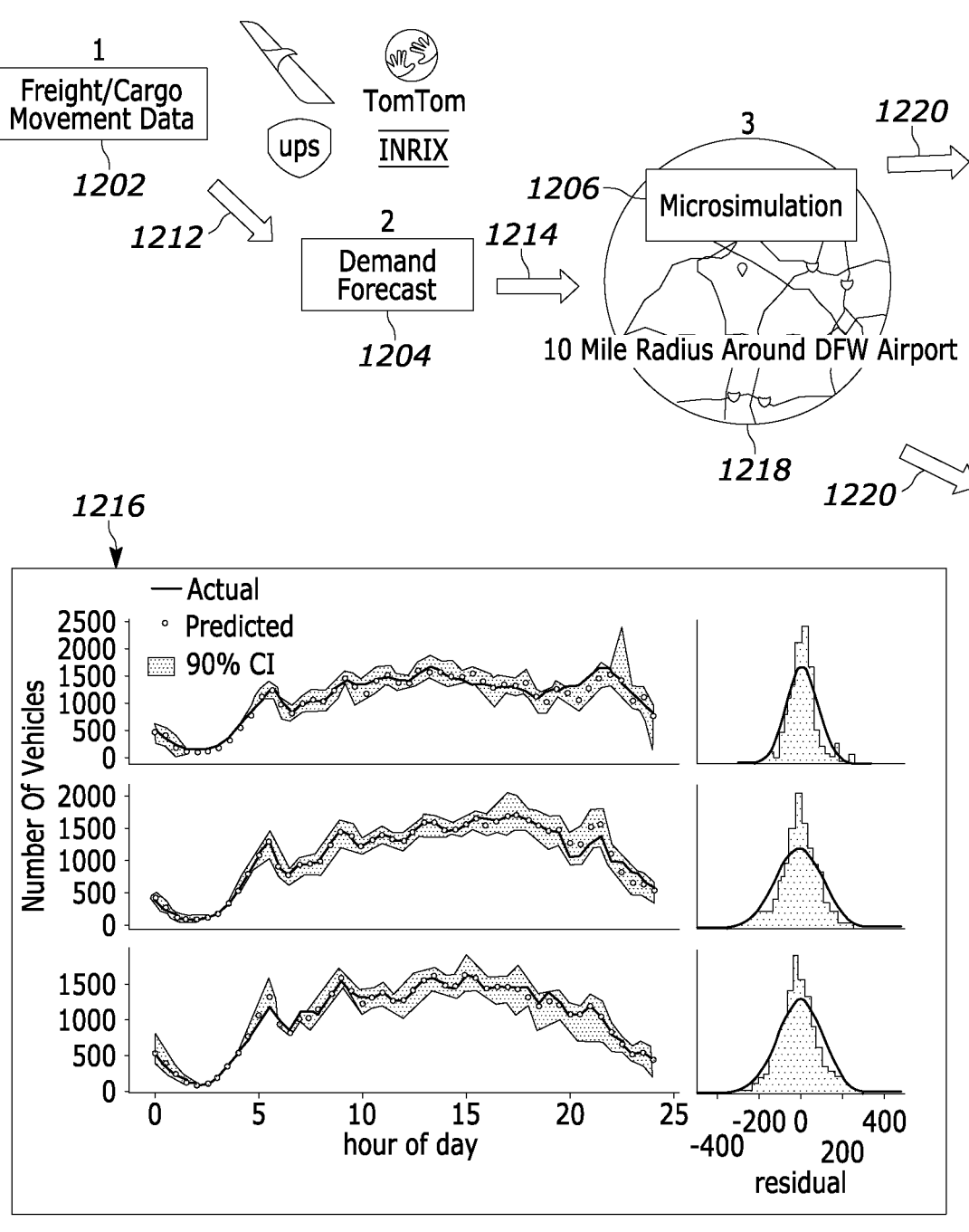
FIG. 12 illustrates an example of a digital twin-based method for reducing peak power and energy consumption in a physical system according to this disclosure.

FIG. 2 illustrates an example of the digital twin-based system 200 according to this disclosure. The embodiment of the digital twin-based system 200 shown in FIG. 2 is for illustration only. Other embodiments could be used without departing from the scope of the present disclosure. The digital twin-based system 200 of FIG. 2 may, for example, incorporate or be used in connection with or the electronic device 100 of FIG. 1 to for training a DT 114a, 114b, 114c as a virtual representation of a corresponding physical system 202, 204, 206, respectively. The digital twin-based system 200 of FIG. 2 may, for example, incorporate or be used in connection with the electronic device 100 of FIG. 1 for utilizing a trained DT 114a, 114b, 114c to implement a digital twin-based method according to embodiments of this disclosure. According to this disclosure, an example digital twin-based method is for reducing peak power and energy consumption in a physical system by utilizing a digital twin-based system trained as a virtual representation of the physical system, as shown in FIG. 12. According to this disclosure, another example digital twin-based is for predicting a delayed departure of a transport vehicle based on traffic flow information in a physical system by utilizing a digital twin-based system trained as a virtual representation of the physical system, as shown in FIG. 13. According to this disclosure, another example digital twin-based method is for predicting traffic flow information based on a selected alternative for redirection of the traffic flow in a physical system by utilizing a digital twin-based system trained as a virtual representation of the physical system, as shown in FIGS. 7-10 and 14. For ease of explanation, this disclosure provides a non-limiting scenario in which the first DT 114a is a digital twin of one or more buildings (for example, terminal buildings and office buildings) of an airport, the second DT 114b is a digital twin of land within boundaries of the airport, and the third DT 114c is a digital twin of the airfield and airspace of the airport. Note, however, that the digital twin-based system 200 of FIG. 2 may be used with any other suitable device and in any other suitable system.

The system 200 includes at least one physical system, for example, a first physical system 202, second physical system 204, and third physical system 206. The system 200 includes one or more sensors 130a-130c, one or more databases 132a-132c, one or more controllers 134a-134c a physical component, and one or more IoT and other connected data sources 136a-136c associated with a corresponding physical system 202, 204, 206, respectively. In certain embodiments, the databases 132a-132c are separate, and in other embodiments, the databases 132a-132c are integrated as a combined database 132. The system 200 includes one or more electronic devices 100a-100c, each of which includes a corresponding DT 114a-114c that affects operational control of a corresponding physical system 202, 204, 206, respectively. Each of the electronic devices 100a-100c is connected to the database 132, for example, via the network 120. In certain embodiments, each electronic device 100a, 100b, 100c includes a corresponding database 132a,132b, 132c which may be coupled to the corresponding DT 114a, 114b, 114c internally within the electronic device 100a, 100b, 100c, respectively. The system 200 includes network connections 208 from the DTs 114a, 114b, 114c to one or more service-providing servers 210, which may provide data for updating the database 132 or as inputs to functions executed by the DTs 114a-114c. The system 200 includes network connections 212 from the DTs 114a, 114b, 114c to one or more user devices 214 (also referred to as ser equipment (UE)), such as client computer 214a or a smartphone 214b. The client computer 214a can be a desktop or laptop computer. The smartphone 214b can be a mobile device, such as a tablet or wearable device (e.g., smartwatch).

The first DT 114a is a digital twin of the first physical system 202, the second DT 114b is a digital twin of the second physical system 204, and the third DT 114c is a digital twin of the third physical system 206. For example, the first DT 114a receives sensor measurements 216a from the sensors 130a associated with the first physical system 202, for example, via the network 120. The first DT 114a receives state information and other data 218a from the first IoT data sources 136a associated with the first physical system 202, for example, via the network 120. The first DT 114a communicates control signals 220a to the first controllers 134a for controlling operations of the first physical system 202, for example, via the network 120. The second DT 114b and third DT 114c respectively receive sensor measurements 216b, 216c, state information and other data 218b-218c from the sensors 130b and 130c and data sources 136b and 136c, and respectively communicate control signals 220b, 220c with the controllers 134b and 134c associated with the second physical system 204 and third physical system 206, which is in an analogously way as the first DT 114 associated with the first physical system 202. In certain embodiments, the DTs 114*a*, 114*b*, 114*c* interface with each other such that output data from one DT (114*a*) is provided as input data to another DT (114*b* and/or 114*c*), for example, via a network connection.

The network connections 208 may include a connection to an application programming interface (API) web service provided by the National Weather Service (NWS) of the U.S. government, or the State of Texas Department of Transportation (TxDOT). As such, the service-providing servers 210 may include a server of a third party service provider, such as the NWS, or TxDOT. For example, the system 200 can be referred to as a server system, and the service-providing servers 210 are external server systems.

Although FIG. 2 illustrates one example of a digital twin-based system 200, various changes may be made to FIG. 2. For example, various components in FIG. 2 may be combined, further subdivided, replicated, omitted, or rearranged and additional components may be added according to particular needs. As a particular example, the physical systems 202-206 could represent other physical systems, such as train stations, ocean ports, or campus of a corporate headquarters.

Figure 3:
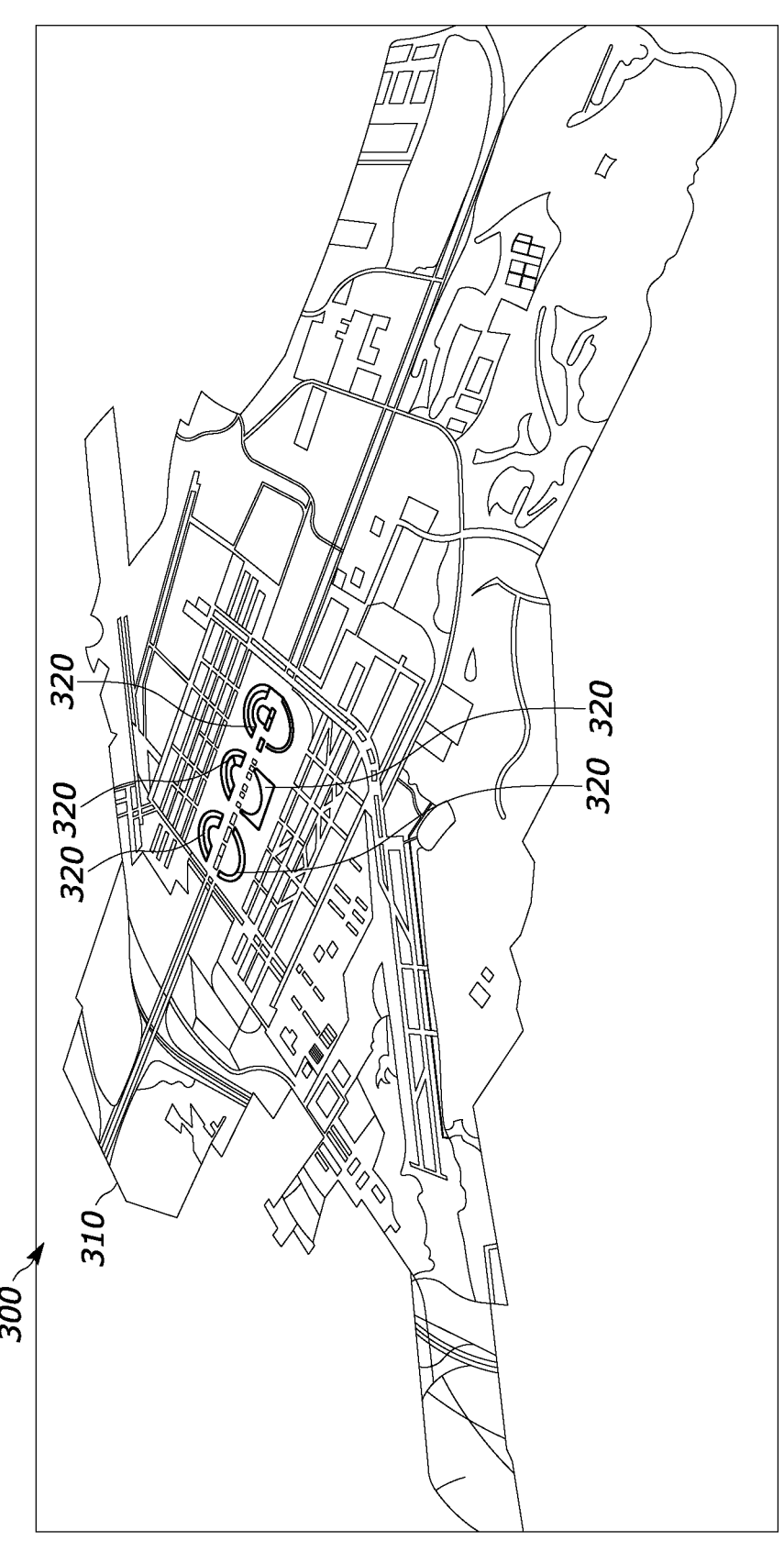
FIG. 3 illustrates an aerial view image of a geographical area containing multiple physical systems according to this disclosure.

FIG. 3 illustrates an aerial view image of a geographical area 300 containing multiple physical systems according to this disclosure. Particularly, the geographical area 300 is the land at and within the boundary 310 of the airport, such as Dallas Fort Worth International Airport (DFW). For distinction, land outside the boundary 310 is mildly blurred and has a muted or lighter shade, and in comparison, land inside the boundary 310 has darker shades. The geographical area 300 includes multiple buildings 320 of the airport (such as first physical system 202 of FIG. 2), land within boundaries of the airport (such as second physical system 204 of FIG. 2), and the airfield and airspace of the airport (such as third physical system 206 of FIG. 2). The buildings of the airport include terminal buildings and office buildings.

According to this example, a first digital twin 114*a* may be a digital representation of buildings of the airport. The first digital twin 114*a* reduces peak power and overall energy consumption while informing improvements in airport operations, for example: using flight schedules to forecast building occupancy levels; using weather forecasts to predict heating/cooling demand and grid conditions; and providing the flexibility for using on-site renewables and storage. For example, based on predicted grid conditions (e.g., price per kW is above a threshold price; a predicted demand response signal instructing a reduction of electric load) of electric utility grid infrastructure, the DT 114 can send control signals to a controller of on-site renewable energy generators and on-site energy storage devices to modify (e.g., increase) output. A behind-the-meter-storage (BTMS) system defines optimal system designs and energy flows for thermal and electrochemical behind-the-meter-storage with on-site photovoltaic (PV) generation enabling high-power charging of passenger vehicles and airport vehicles.

The second DT 114*b* is a digital representation of the landside of the airport and enhances passenger mobility and freight mobility to and from the airport.

The third DT 114*c* is a digital representation of the airside of the airport. The third DT 114*c* optimizes the movement of aircraft and ground-support equipment to reduce (for example, minimize) delays and reduce energy consumption.

Figure 4:
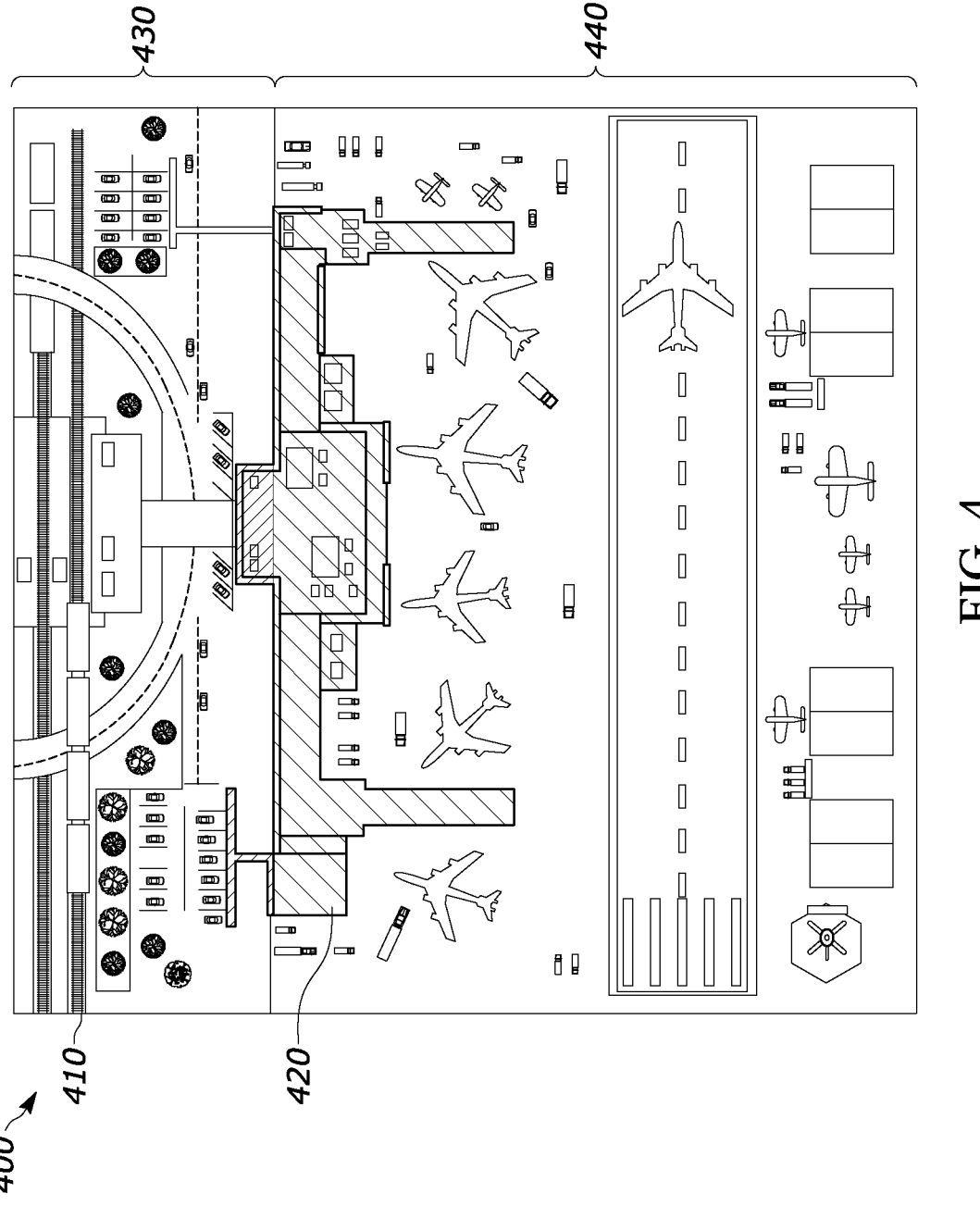
FIG. 4 illustrates an example geographical area containing multiple physical systems according to this disclosure.

FIG. 4 illustrates an example geographical area 400 containing multiple physical systems according to this disclosure. Particularly, the geographical area 400 is a top view of the land at and within the boundary 410 of an example airport. The geographical area 400 includes one terminal building 420 of the airport (such as first physical system 202 of FIG. 2), land 430 within boundaries of the airport (such as second physical system 204 of FIG. 2) excluding the airfield 440, and the airfield 440 of the airport (such as third physical system 206 of FIG. 2). An airfield is space specifically allocated for aircraft to take off and land. In this example, the airfield 440 includes a paved runway, but other airfields may include a runway that is grass, gravel, or strip of dirt.

Figure 5:
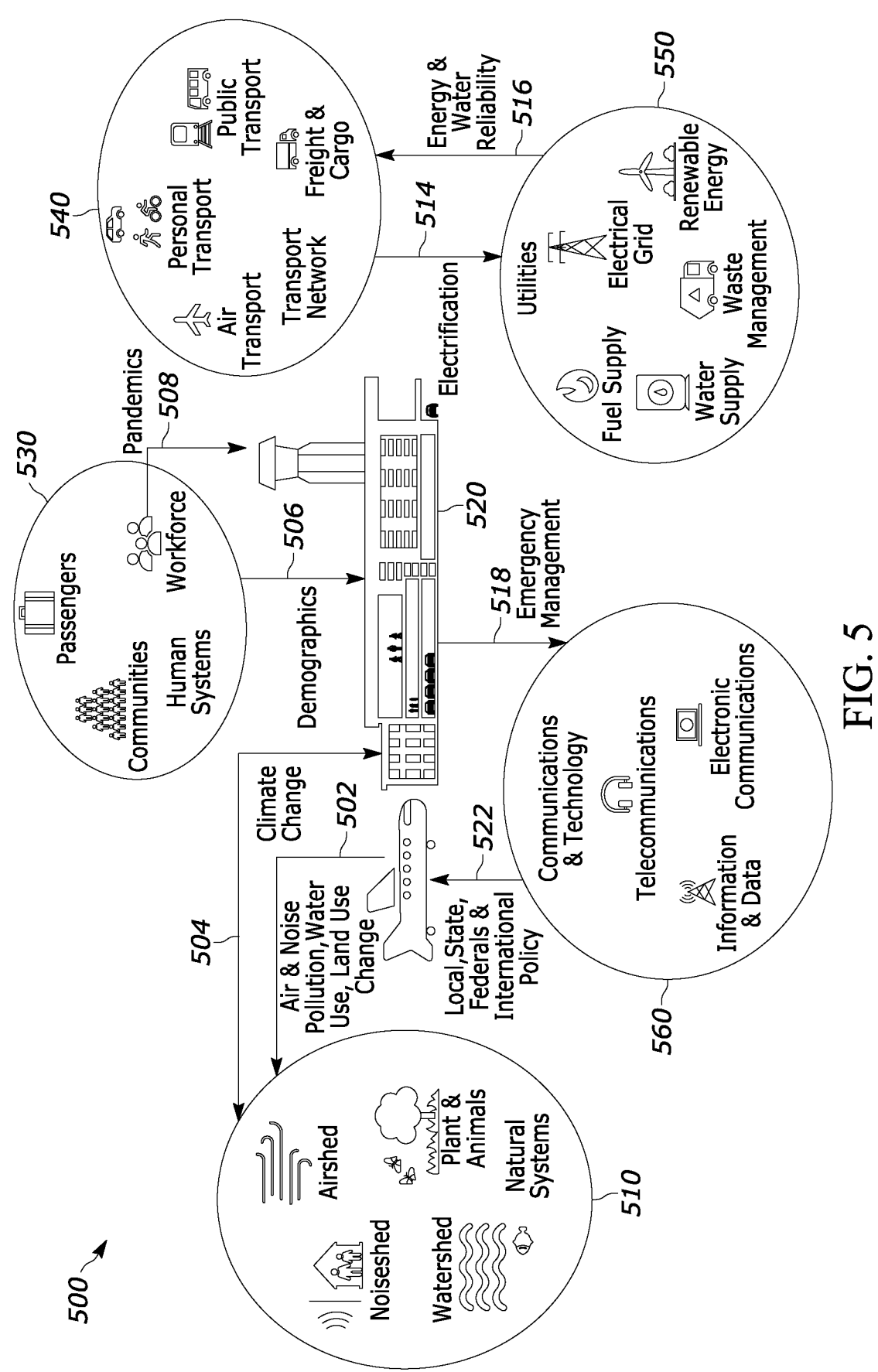
FIG. 5 illustrates an example complex ecological system that is an airport, according to this disclosure.

FIG. 5 illustrates an example complex ecological system that is an airport, according to this disclosure. For ease of explanation, the complex ecological system will be referred to as the airport 500. The airport 500 includes natural systems 510, buildings 520, human systems 530, transport networks 540, utilities 550, and a communications and technology system 560.

Air pollution, noise pollution, changes to water usage, and changes to land usage are generated by the airport 500 and input to the natural systems 510, as shown by arrow 502. The Climate change affects natural systems 510 of the airport, as shown by the bidirectional arrows 504. The human systems 530 input demographics 506 into the airport and sometimes output pandemics 508 that affect the airport. Electrification occurring in the transport network 540 generates demand for utilities 550, as shown by arrow 514. Energy reliability and water reliability are provided from the utilities 550, as shown by arrow 516. Emergency management 518 depends upon the communications and technology systems 560. Policy from local, state, federal, and international government bodies are inputs to airport operations, as shown by arrow 522. For example, the communications and technology systems 560 having infrastructural upgrades to 5G cellular technology caused government bodies to enact policies that affected airport operations.

Although FIG. 5 illustrates one example of a complex ecological system that is an airport 500, various changes may be made to FIG. 5. For example, various components in FIG. 5 may be combined, further subdivided, replicated, omitted, or rearranged, and additional components may be added according to particular needs.

Figure 6:
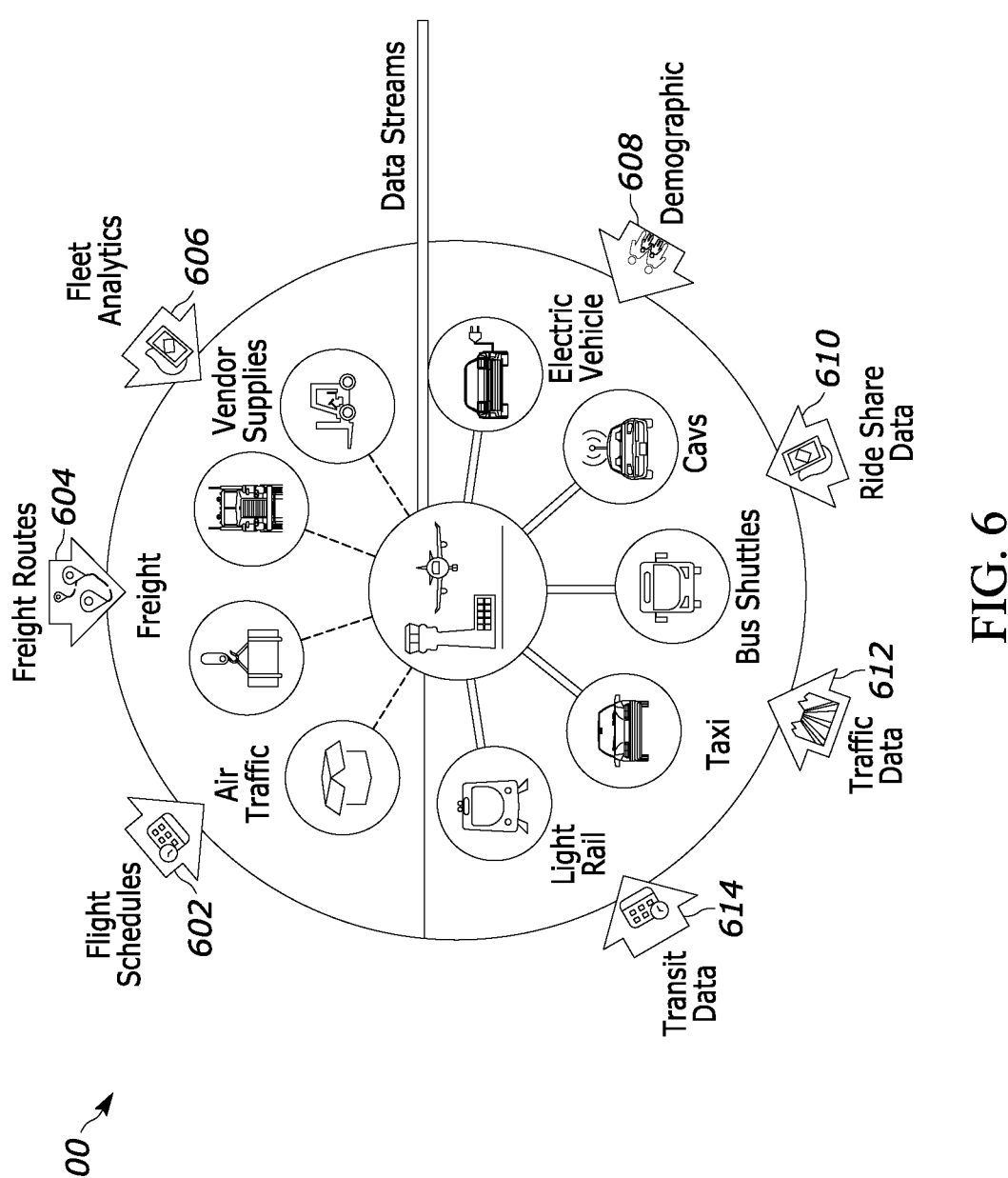
FIG. 6 illustrates example data streams into the electronic device associated with an airport according to this disclosure.

FIG. 6 illustrates example data streams 600 into the electronic device 100 associated with an airport according to this disclosure. The data streams 600 can be stored in the database 132 and analyzed by the DT 114. The embodiment of the data streams 600 shown in FIG. 6 is for illustration only. Other embodiments could be used without departing from the scope of the present disclosure.

The data streams 600 can be received from service-providing servers 210 (FIG. 2). The data streams 600 include flight schedules data 602, freight routes data 604, fleet analytics data 606, demographic data 608, ride share data 610, traffic data 612, and transit data 614. The DT 114 can predict air traffic based on the flight schedule data 602. The DT 114 can predict load factor values based on the freight routes data 604, which may include a value (e.g., volume, weight, and/or monetary) of cargo to be transported. A load factor value can be a percentage utilization of the number of seats and/or the amount of cargo space on an aircraft. The DT 114 can predict values of vendor supplies based on the fleet analytics data 606. The DT 114 can determine the number of electric vehicles at the airport, the number of electric vehicle charging stations that are requested, available, or occupied based on the demographic data 608. For example, the demographic data 608 may indicate a parking permit is issued for an electric vehicle associated with an employee or and employee badge ID. The demographic data 608 may indicate a request to reserve an electric vehicle charging station. The DT 114 can predict values of CAVS, bus shuttles, taxi vehicles, and light rail vehicles based on at least of the demographic data 608, ride share data 610, traffic data 612, and transit data 614.

Figure 7:
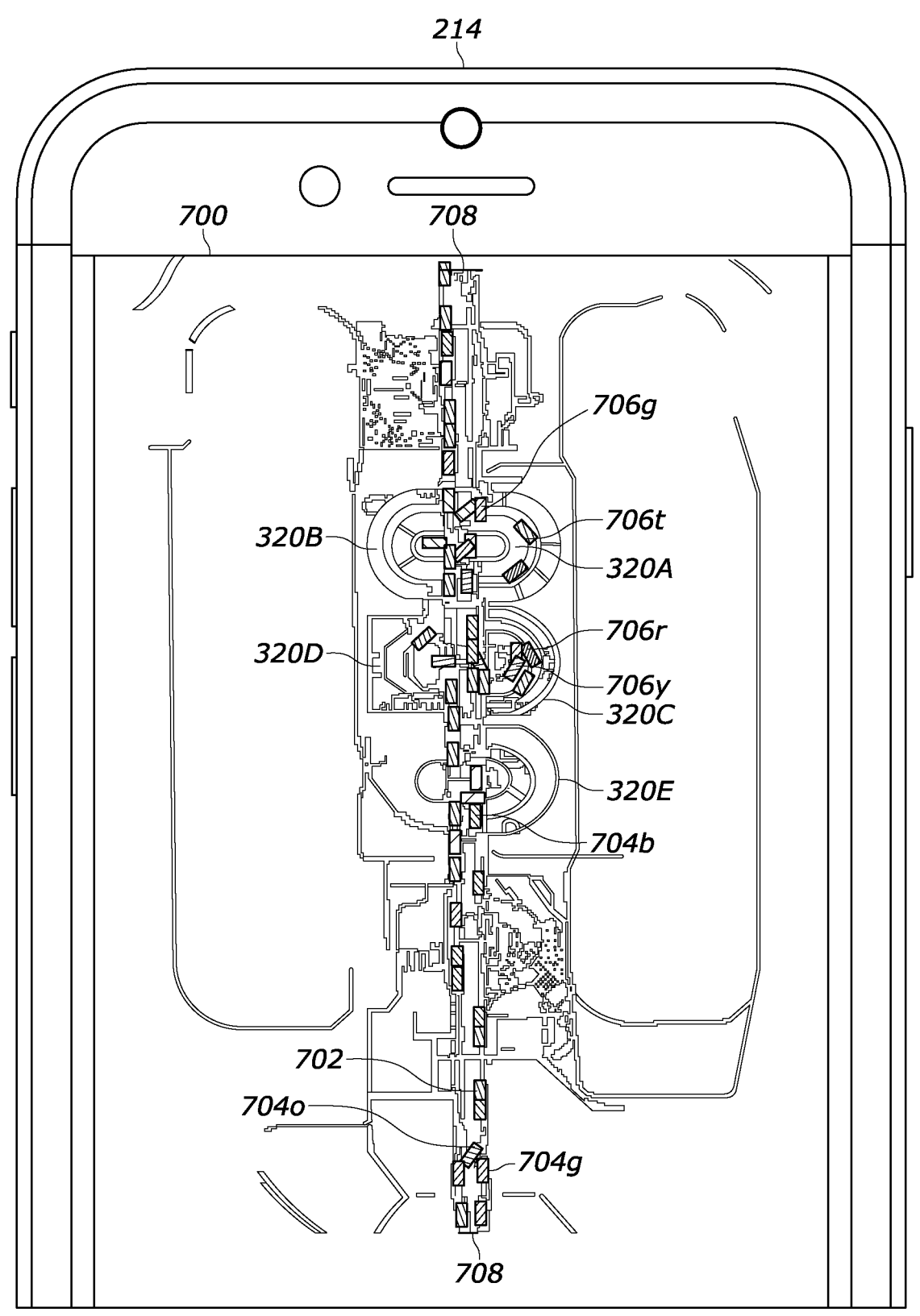
FIG. 7 illustrates an example user interface generated by a digital twin tool and displayed by a user device according to this disclosure.

FIG. 7 illustrates an example user interface 700 generated by the DT 114 and displayed by a user device 214 according to this disclosure. The embodiment of the user interface 700 shown in FIG. 7 is for illustration only. Other embodiments could be used without departing from the scope of the present disclosure.

The user interface 700 displays a computer-aided design (CAD) rendering of a road 702 passing through an airport and the buildings 320 at the airport and, for example, a top view in line drawing format. In this example, the second DT 114*b* includes a digital model of the second physical system 204, including a two-dimensional (2D) digital model of the road 702 in the form of the CAD rendering. The digital model of the second physical system 204 includes the road 702, which includes multiple sections of road for automobiles to access each building 320 at curbside. Curbside can be boundary where a passenger of an automobile converts to a pedestrian by exiting the automobile.

Sensors 130*a* detect and measure phenomena in the first physical system 202, and send sensor data to the first DT 114*a*. Sensors 130*b* detect and measure phenomena in the second physical system 204, and send sensor data to the second DT 114*b*. In this example, the sensors 130*b* send traffic flow information (including traffic flow values) to the second DT 114*b*. The second DT 114*b* links the locations of the sensors 130*b* to traffic flow information received from the sensors, respectively. For example, a sensors 130*b* count the number of vehicles entering and the number of vehicles exiting through a boundary of the second physical system 204, for example, by passing through a toll plaza 708. The numbers can be referred to as toll plaza throughput. The sensors 130*b* can include traffic counters that detect the speed at which vehicles are traveling along each section of the road 702. The sensors 130*b* can include traffic cameras located at each lane of the toll plaza, at each bridge, at each ramp for accessing a curbside of a building, etc. The traffic cameras can indicate whether a particular lane of a particular section of road includes a vehicle that are parked, idling, or moving, and can indicate a speed the vehicles. Based on the location of the sensors 130*b*, the second DT 114*b* determines whether a section of road is congested for automobiles, for example, by determining that the received traffic flow values are outside an expected value (or range of expected values). For example, if the traffic counters and traffic camera sensors 130*b* indicate that a current speed for section of road is too slow compared to a range speeds expected for that section of road, then the second DT 114*b* can generate a visual indicator of congestion. The range of speeds expected can be based on the speed measured by the sensors 130*b* for the same time of day on other days, the same day of the year in other years, etc. The speeds outside of the range of speeds expected can represent the slowest 5% of the speeds previously measured for that section of road. The second DT 114*b* can update the database 132 to indicate that a section of the road 702 is determined congested during a specific period of time (e.g., start timestamp and end timestamp, or duration of time).

The user interface 700 displays visual indicators 704, 706 of traffic flow values, including amounts of vehicle traffic in road areas, amounts of pedestrian traffic inside buildings in specific areas (e.g., security checkpoints, gate areas), amounts of pedestrian traffic outside buildings in curbside areas. The visual indicators 704 indicate traffic of roadway vehicles, and the visual indicators 706 indicate traffic of pedestrians. The visual indicators 704, 706 are colored differently to indicate different traffic flow values, such as green, light turquoise blue, dark blue, yellow, orange, and red for varying ranges of traffic flow values (for example, ranges based a standard deviation and/or average value).

In the case of pedestrians, a green visual indicator 706*g* at a curbside area may indicate a volume of pedestrian traffic in a first range of values (e.g., a range of normality for pedestrians; or a range relative to a reference value, expected value, or average value). The light turquoise blue visual indicator 706*t* in a gate area may indicate a volume of pedestrian traffic in a second range of values, which may be greater than the first range of values of volume of pedestrian traffic, and which may be less than a third range of values of volume of pedestrian traffic. In a similar manner, third through sixth ranges of values of volume of pedestrian traffic are greater than second through fifth ranges of values of volume of pedestrian traffic, respectively. A dark blue visual indicator may indicate in a gate area may indicate a volume of pedestrian traffic in a third range of values. The yellow visual indicator 706*y* in a security checkpoint area may indicate a volume of pedestrian traffic in a fourth range of values. An orange visual indicator 706*o* may indicate area may indicate a volume of pedestrian traffic in a fifth range of values. The red visual indicator 706*r* in the gate area may indicate a volume of pedestrian traffic in a sixth range of values.

Analogously, in the case of vehicles, a green visual indicator 704*g* along the road 702 may indicate a volume of vehicle traffic in a first range of values (e.g., a range of normality for vehicles; or a range relative to a reference value, expected value, or average value), or that a current speed of vehicle traffic is within a range of normality for vehicle speeds. An orange visual indicator 704*o* diagonal across the road 702 may indicate a speed of vehicle traffic accelerating decelerating in order to enter or exit a toll plaza (including multiple lanes with toll booths), or may indicate a volume of vehicle traffic in a fifth range of values.

The DT 114 can associate (e.g., link) each of the terminal buildings 320*a*-320*e* with a route (or multiple routes) for passengers seeking to enter the building. The passengers seeking to enter the building can include passengers of automobiles seeking to enter the building as workers whose jobsites are inside the building, and passengers ticketed for a flight on an aircraft (i.e., a transport vehicle) scheduled to depart from a particular boarding gate (e.g., a boarding location, an arrival/departure gate) inside the building. The passengers seeking to enter the building can take a route that includes one or more sections of the road 702 for automobiles to access the building. The passengers seeking to access a boarding location inside the building can take a route that includes at least one access point (e.g., a security screening checkpoint) inside the building for pedestrians to pass through. To create a building-to-route association, the DT 114 can associate a particular building, such as building named Terminal A, each of the sections of the route including: the section of road adjacent to a curbside of Terminal A, section of road that is a bridge to the curbside of Terminal, a section of road that is a ramp to the bridge, and a section of road connecting the ramp to a toll plaza for automobiles entering the physical system 202 via the road 702. Further, DT 114 can associate Terminal A with an alternate second route for passengers (e.g., workers; people without a boarding pass) seeking to enter a public area in the building, and a different alternate third route for passengers (e.g., ticketed passengers) seeking to enter a restricted area in the building.

The restricted area includes boarding gates. The restricted area is for people who have passed through a security screening access point, such as ticketed passengers or flight crewmembers. For example, the physical system 202 can include an inter-terminal transfer train rail service that operates stations in the restricted areas of each of the buildings 320. For example, ticketed passenger scheduled to depart from a boarding location inside Terminal A can take an alternate third route by passing through a security screening access point into the restricted area of another building 320 such as Terminal B, then riding and inter-terminal transfer train rail service to the restricted area of Terminal A.

Although FIG. 7 illustrates one example of a user interface 700, various changes may be made to FIG. 7. For example, various components in FIG. 7 may be combined, further subdivided, replicated, omitted, or rearranged and additional components may be added according to particular needs. As a particular example, the visual indicators 704 and 706 can have different colors than described above, can have hash patterns instead of colors, or can blink at different flash rates.

Figure 8:
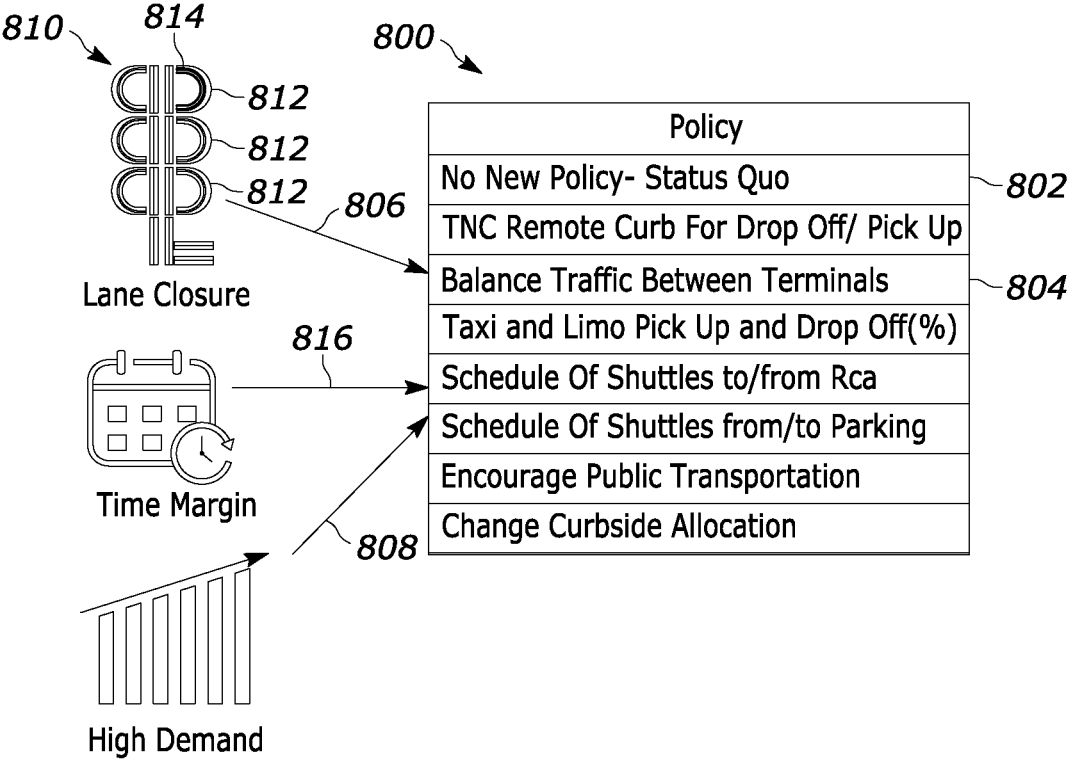
FIG. 8 illustrates an example list of user-selectable state alternatives that a digital twin tool displays according to this disclosure.
Figure 9:
FIG. 9 illustrates a user interface showing a traffic flow of vehicles and pedestrians that a digital twin tool generates in response to a selection of a first state alternative from the list of user-selectable state alternatives in FIG. 8, according to this disclosure.
Figure 10:
FIG. 10 illustrates a user interface showing a predicted traffic flow of vehicles and pedestrians that the digital twin tool generates in response to a selection of the third state alternative from the list of user-selectable state alternatives in FIG. 8, according to this disclosure.
Figure 10:
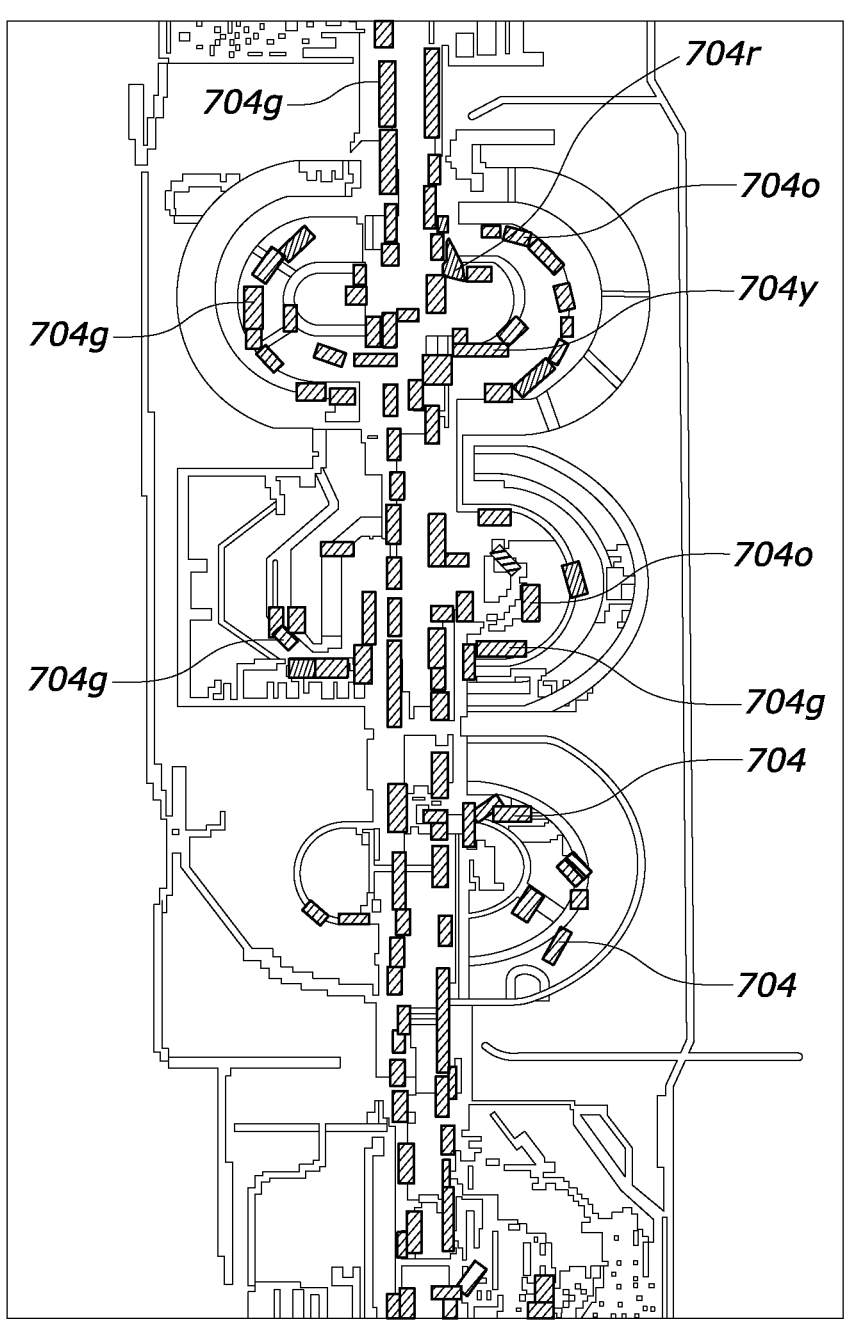

FIG. 8 illustrates an example list 800 of user-selectable state alternatives that the DT 114 displays according to this disclosure. FIG. 9 illustrates a user interface 900 showing a (actual or predicted) traffic flow of vehicles and pedestrians that the DT 114 generates in response to a selection of a first state alternative 802 (illustrated as "No new policy—status quo") from the list 800 of user-selectable state alternatives in FIG. 8. FIG. 10 illustrates a user interface 1000 showing a predicted traffic flow of vehicles and pedestrians that the DT 114 generates in response to a selection of the third state alternative 804 (namely, a new policy to "Balance traffic between terminals") from the list 800 of user-selectable state alternatives in FIG. 8. FIGS. 8-10 are used to describe at least three different ways that the DT 114 can be used: (1) to undergo a machine learning (ML) model training process; (2) to run simulations; and (3) to perform real-time operational control. For ease of describing FIGS. 8-10, the DT 114 with the traffic optimizer 138a (FIG. 2) will be referred to as simply DT 114. When the DT 114 undergoes the ML model training process, the DT 114 learns a historical condition and a historical outcome that resulted from that historical condition. During the ML training, the DT 114 receives input that is historical data, referred to as a training condition, so that the DT 114 learns that the training condition is a type of data to accept as an input condition. Also during ML training, the DT 114 receives a historical outcome that corresponds to the training condition and learns that the historical outcome is a type of data to output as a prediction. In this case, the historical outcome can include historical measurements of traffic flow data (e.g., vehicle speeds, number of vehicles that passed through a particular section of road from end-to-end), and the training condition can include a status information (e.g., OPEN/CLOSED lane, whether the road is in a construction zone, whether multiple-lane section of road has all lanes open or a number of lanes closed, etc.). A set of pre-trained conditions includes each training condition that the DT 114 learns through the ML training. After ML training is completed, the DT 114 can be used to run simulations, wherein the DT 114 receives input data that can be historical data or real-time data, and the DT 114 outputs a prediction representing a prospective/predicted outcome. The prediction includes predicted traffic flow data, such as predicted vehicle speeds, predicted values of roadway congestion, etc. Also after ML training is completed, the DT 114 can be used to perform real-time opera-tional control, such as in real-time operational scenarios, wherein both the input and output of the DT 114 are real-time data.

Referring to FIG. 8, the DT 114 can output the list 800 to a display device connected to the electronic device 100, or a display of a user device 214. The embodiment of the list 800 shown in FIG. 8 is for illustration only. Other embodiments could be used without departing from the scope of the present disclosure.

In the example shown, from among the eight state alternatives in the list, a user may select at least one state alternative. The first state alternative 802 is a status quo state and without a new policy. When the first state alternative 802 is selected, input and output of the DT 114 are real-time data (or near real-time data). That is, the DT 114 displays a digital representation of current conditions and current measurements of traffic flow.

A second state alternative is illustrated as "TNC remote curb for drop off/pick up." TNC is an abbreviation for transportation network companies, like Uber™ and Lyft™. When the second state alternative is selected, the DT 114 can control traffic information signs to display a message (for example, a predetermined message) instructing TNC drivers that their location for drop off/pick up is relocated to a specified new destination, namely, the TNC remote curb. When TNC drivers read the message corresponding to the second state alternative, they redirect away from an original route that is destined for an original destination (for example, the curbside of Terminal A that has a vehicle lane closure 814), and redirect toward a new route destined for the specified new destination (i.e., NTC remote curb).

The eighth state alternative is illustrated as "Change curbside allocation." When the eighth state alternative is selected, the DT 114 can balance traffic by controlling traffic information signs to display a message instructing automobile drivers to redirect away from an original destination associated with a vehicle lane closure 814 (or other location that the policymaker wants vehicles or pedestrians to avoid). For example, if all of the security checkpoint lanes inside Terminal A building are closed, then the DT 114 can balance pedestrian traffic and vehicular traffic by controlling traffic information signs and pedestrian information signs to display a message instructing passengers (of vehicles and ticketed passengers) to drop off/pick up at curbside of Terminal C and to pass through the security checkpoint lanes at Terminal C. The DT 114 can be configured with other predetermined messages corresponding to different conditions that the DT 114 is trained to recognize.

The third state alternative 804 is to balance traffic between terminal buildings. To make a selection from the list 800, a user input is received at the user device 214 or to a peripheral input device (e.g., keyboard or mouse) connected to the electronic device 100. In this example, the policymaker user has selected the third state alternative 804, which is visually highlighted (e.g., darkened text) compared to the non-selected items in the list 800. In some embodiments, the third state alternative 804 causes the DT 114 to simulate the other alternatives of the list 800, individually or in various combinations. Based on these simulations, the DT 114 can determine which one or combination of the other alternatives most closely satisfies a specified objective. For example, the DT 114 can be configured with an objective to reduce congestion for curbside areas, maximize roadway speeds, prioritize clearing congestion for bus routes over other objectives, or to equalize number of vehicles passing through various sections of the road, or to equalize number of ticketed passengers passing through each of the security access points within the second system 204. That is, in some embodiments, the DT 114 can automatically select from the list 800, and perform operational control based on the selection. For example, to balance traffic between terminals, the DT 114 can identify that the corresponding objective is to equalize number of vehicles passing through various sections of the road. To equalize, the DT 114 can control traffic information signs to display a message instructing automobile drivers to avoid an area associated with congestion (e.g., telling drivers that the road is closed at the curbside of Terminal A), and suggesting that the drivers redirect to one or more new destinations. The message can specify the one or more new destinations based on a measurement of congestion, for example, the message and tell drivers that the estimated time to arrive at the curbside of Terminal C is 2 minutes. The 2 minutes can be estimated based on an estimated travel time from the physical location of the traffic information sign to the new destination.

The fourth state alternative is illustrated as "Taxi and Limo pick up and drop off (%)." When the fourth state alternative is selected, the DT 114 can balance traffic by controlling a traffic information sign that is located along a route designated for taxi and limo drivers, and displaying a message that informs taxi/limo drivers of a number of taxi cars that are already in a taxi queue for a particular terminal build, or a current occupancy percentage of lane reserved for a taxi queue. A taxi driver can read the message corresponding to the fourth state alternative and choose to enter a taxi queue where the current occupancy percentage is low. That is, the DT 114 can output a message that helps the taxi driver to avoid an area associated with congestion.

The fifth state alternative is illustrated as "Schedule of shuttles to/from RCA" (Rental Car Area). When the fifth state alternative is selected, the DT 114 can balance traffic by adjusting a number of rental car buses circulating, as shown at FIG. 11D. When the fifth state alternative is selected, the DT 114 can balance traffic by modifying the routes assigned to rental car buses, as shown at FIG. 11E. For example, the DT 114 can be preconfigured with multiple rental car bus routes, and can switch a fleet of buses from a currently assigned route to a newly selected route. The DT 114 can generate an automated message to multicast the new route assignment to an output device (that includes a transceiver) mounted to a dashboard inside the bus dashboard.

The sixth state alternative is illustrated as "Schedule shuttles from from/to parking." When the sixth state alternative is selected, the DT 114 can balance traffic adjusting the number of shuttles (e.g., shuttle buses) circulating and modifying the routes assigned to the circulating shuttles, in a similar way as performed when the fifth state alternative is selected.

The seventh state alternative is illustrated as "Encourage public transportation." When the seventh state alternative is selected, the DT 114 can balance traffic by sending a predetermined message to subscriber devices, such as an SMS message or a notification message via a mobile application installed on the subscriber devices. The message corresponding to seventh state alternative can instruct owners of the subscriber devices (e.g., smartphone owned by travelers or personnel who work inside the physical systems 202, 204, 206) to change their mode of transportation to public transportation (e.g., light rail). For example, if the toll plaza lanes are all closed, or if a roadway entrance/exit to the airport is closed, then the DT 114 can push a notification message to cause the subscriber devices to display the predetermined message informing a subscribers of the road closure, or an expected delay time associated with the road closure, or a window of time during which public transportation is encouraged.

The DT 114 can determine whether to display a list of alternatives, such as the list 800. That is, the DT 114 displays the list 800 when at least one condition is satisfied from a predefined list of conditions. In this example, each condition included in the predefined list of conditions defines a condition that impedes a route for passengers seeking to enter a building 320, such as Terminal A. From the predefined list of conditions, one condition is satisfied when a multiple-lane section of road necessary for automobiles to access Terminal A is impassible, such as when each of the multiple lanes (812 and 814) of the section of road concurrently have a vehicle lane closure. From the predefined list of conditions, another condition is satisfied when a single-lane section of road necessary for automobiles to access Terminal A is impassible. The predefined list of conditions is not limited to conditions related to sections of road in the second physical system 204, and can include a condition defined by at least one access point inside the building, or a condition defined by at least one passageway (e.g., security checkpoints, concourse, gate areas) inside the building. For example, the predefined list of conditions can include a condition that is satisfied when each of the multiple access points in Terminal A are closed or impassible. The predefined list of conditions is not limited to conditions related to impassible or closed sections of the route. The predefined list of conditions can include a condition that is defined by multiple factors, such as a portion of the route in a congested state, a congestion period of time associated with the congested state (e.g., duration while the sensors 130a-130b detect congestion), a number of people expected to pass through the congested portion of the route but for the congestion in relation to time.

The DT 114 displays the list 800 in response to receiving data 806 indicating a vehicle lane closure at a particular section of road, data 808 indicating a high demand for airport transport, or both 806 and 808. Particularly, the list 800 is displayed if a vehicle lane is closed at a section of road necessary for automobiles to access a terminal building, and a high volume of passengers are scheduled to enter/exit the terminal building (i.e., to access boarding gates in the terminal building) during a time margin 816 that includes times during (and a marginal times before and after) the vehicle lane closure. The time margin 816 is calculated by the DT 114 based on the received data 806 and 808. As an example of the data 806, traffic data 612 (FIG. 6) may include open/close status of the particular section of road, where the data 806 includes the close statuses. As examples of the data 808, freight routes data 604 (FIG. 6) may include volume or weight of cargo to be transported by aircraft; and flight schedules data 602 (FIG. 6) may include number of passengers seats that are sold/available or are occupied/empty, scheduled takeoff/landing times, and terminal building ID associated each scheduled departure/arrival gate.

In certain embodiments, the DT 114 can generate and display a user interface 810 showing multiple sections 812 of road necessary for automobiles to access various terminal buildings. The user interface 810 shows a vehicle lane closure 814 as by highlighting (e.g., red color, blinking, enlarging) the particular section of road having a closure.

Referring to FIG. 9, the policymaker user selected the first state alternative 802 (i.e., status quo) from the list 800 of user-selectable state alternatives in FIG. 8. In response to the selection of the first state alternative 802, the DT 114 displays the user interface 900 showing the (actual or predicted) traffic flow of vehicles and pedestrians during the time margin 816. In this the user interface 900, several road sections show are highlighted using a red visual indicator 704*r* to indicate an extremely high volume of vehicle traffic, such as in a sixth range of values.

In training embodiments, the user interface 900 shows actual traffic flow of vehicles and pedestrians during the time margin 816. For example, (historical or current) measurements of traffic flow data (from sensors 130*a*-130*b*) can be input to a traffic flow optimizer 138 to train the optimizer 138 to output the user interface 900 as a traffic flow resulting from a training condition in which a (historical or current) vehicle lane closure 814 on the particular section of road (which is highlighted in the user interface 810 of FIG. 8) is concurrent with (historical or current) measurements of high demand (similar to 808).

In operational embodiments, the user interface 900 shows the predicted traffic flow of vehicles and pedestrians during the time margin 816. After the DT 114 is trained, the DT 114 can be used in a stress test scenario or used in a real-time operational scenario. When the DT 114 is used in a stress test scenarios, the data 806 includes hypothetical parameters that are input to the DT 114 as an input condition. The trained DT 114 recognizes the input condition is similar to (e.g., exhibits a similar pattern as) the training conditions, and generates the predicted traffic flow based similarities between the input condition and training conditions. For example, the DT 114 may predict a volume of pedestrian traffic in an above average range of values (e.g., sixth range of values) inside a building in an area near a boarding gate where the flight schedule indicates a delayed flight associated with the boarding gate.

In a real-time operational scenario, the data 806 includes traffic flow information detected in real-time by the sensors 130*b* that sense the flow of road vehicle traffic, and the sensors 130*a* that sense the flow pedestrian traffic in the building. The DT 114 can include a traffic flow optimizer that generates the predicts the predicted traffic flow based similarities between the real-time traffic flow information (as input conditions) and training conditions.

Referring to FIG. 10, the policymaker user selected the third state alternative 804 (i.e., a new policy to "Balance traffic between terminals") from the list 800 of user-selectable state alternatives in FIG. 8. In response to the selection of the third state alternative 804, the DT 114 displays the user interface 1000 showing the predicted traffic flow of vehicles and pedestrians during the time margin 816. Also, the user interface 1000 shows several road sections shown are highlighted using green visual indicator 704*g* to indicate low volume of vehicle traffic; fewer of the road sections are highlighted in yellow or orange visual indicators 704*y* or 704*o*; and even fewer are highlighted with a red visual indicator 704*r*.

By balancing traffic between terminal buildings, the DT 114 displays some road sections that did not have any visual indicators in the status quo user interface 900 (FIG. 9) now show visual indicators 704 in the new policy user interface 1000 (FIG. 10). By balancing traffic between terminal buildings, fewer automobiles stand with idling engines along the roads at the airport, thereby reducing air pollution released to natural systems 510 of the airport.

Although FIG. 10 illustrates one example predicted traffic flow of vehicles and pedestrians, various changes may be made to FIG. 10. As a particular example, if another state alternative is selected from among the list 800 of FIG. 8, other than the third state alternative 804, then a DT 114 generates and outputs a user interface showing a different values of traffic flow. As another particular example, the DT

114 enables the user to zoom in on the user interface to a granularity such that a visual indicator 704 represents the space that a single automobile occupies in a lane of the road sections.

Figure 11A:
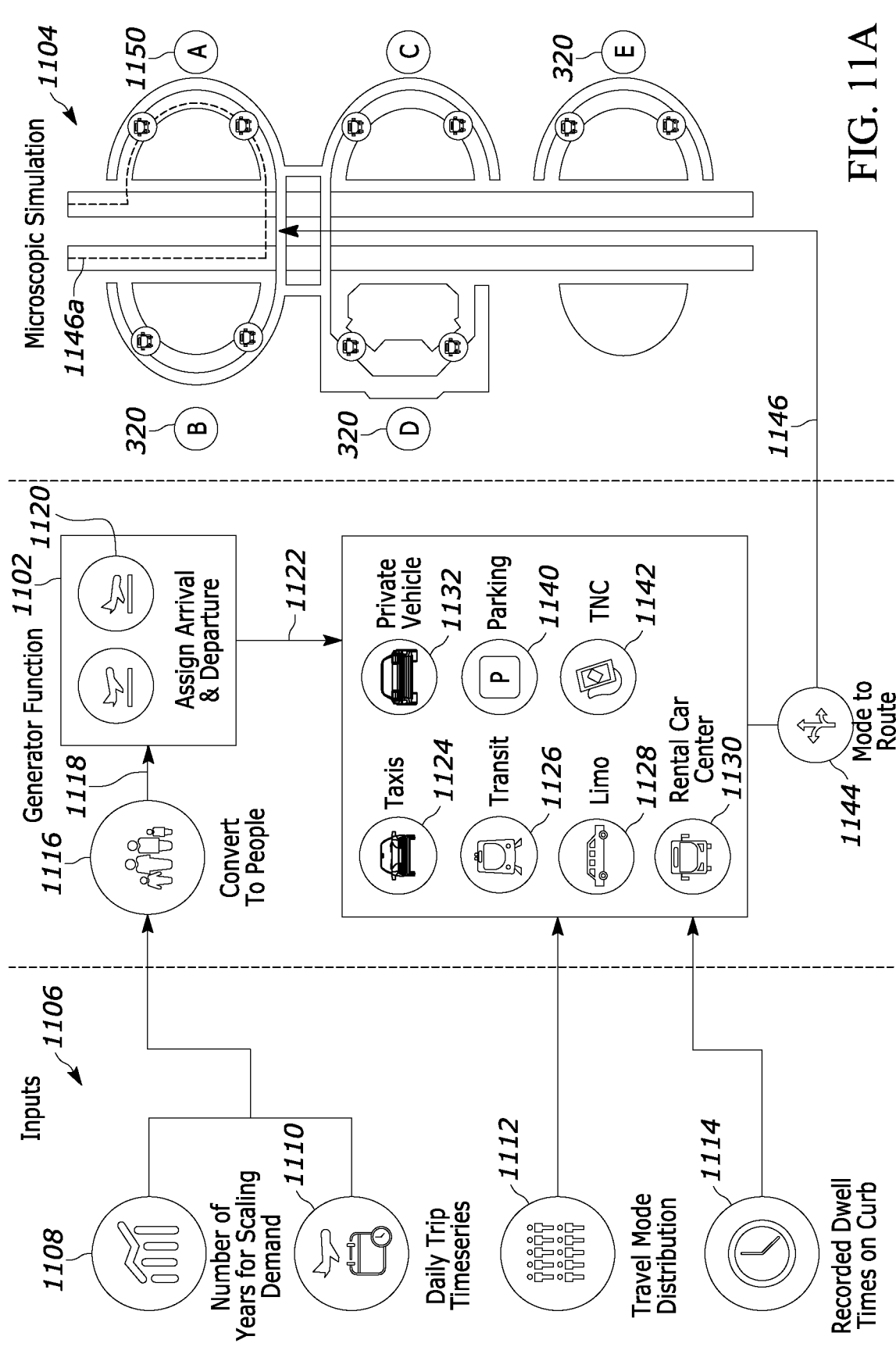
FIG. 11A illustrates a generator function within a digital twin for generating a microscopic simulation including a predicted traffic flow of vehicles and pedestrians, according to this disclosure.

FIG. 11A illustrates a generator function 1102 within the DT 114 for generating a microscopic simulation 1104 including a predicted traffic flow of vehicles and pedestrians, according to this disclosure. The microscopic simulation 1104 can be displayed as a user interface, similar to the user interface 1000 of FIG. 10. Other embodiments could be used without departing from the scope of the present disclosure.

The generator function 1102 generates the microscopic simulation 1104 based on inputs 1106 including number of years for scaling demand 1108 and corresponding daily trip timeseries 1110, travel mode distribution 1112, and recorded dwell times on curb 1114. For example, the generator function 1102 converts 1116 the number of years for scaling demand 1108 and corresponding daily trip timeseries 1110 to people information 1118 entering the physical system (such as the first physical system 202; or building 320 at an airport). The people information 1118 can include a number of passengers, number of ground crew people who are not boarding an aircraft, and number of air crew people who are boarding an aircraft.

Figure 11B:
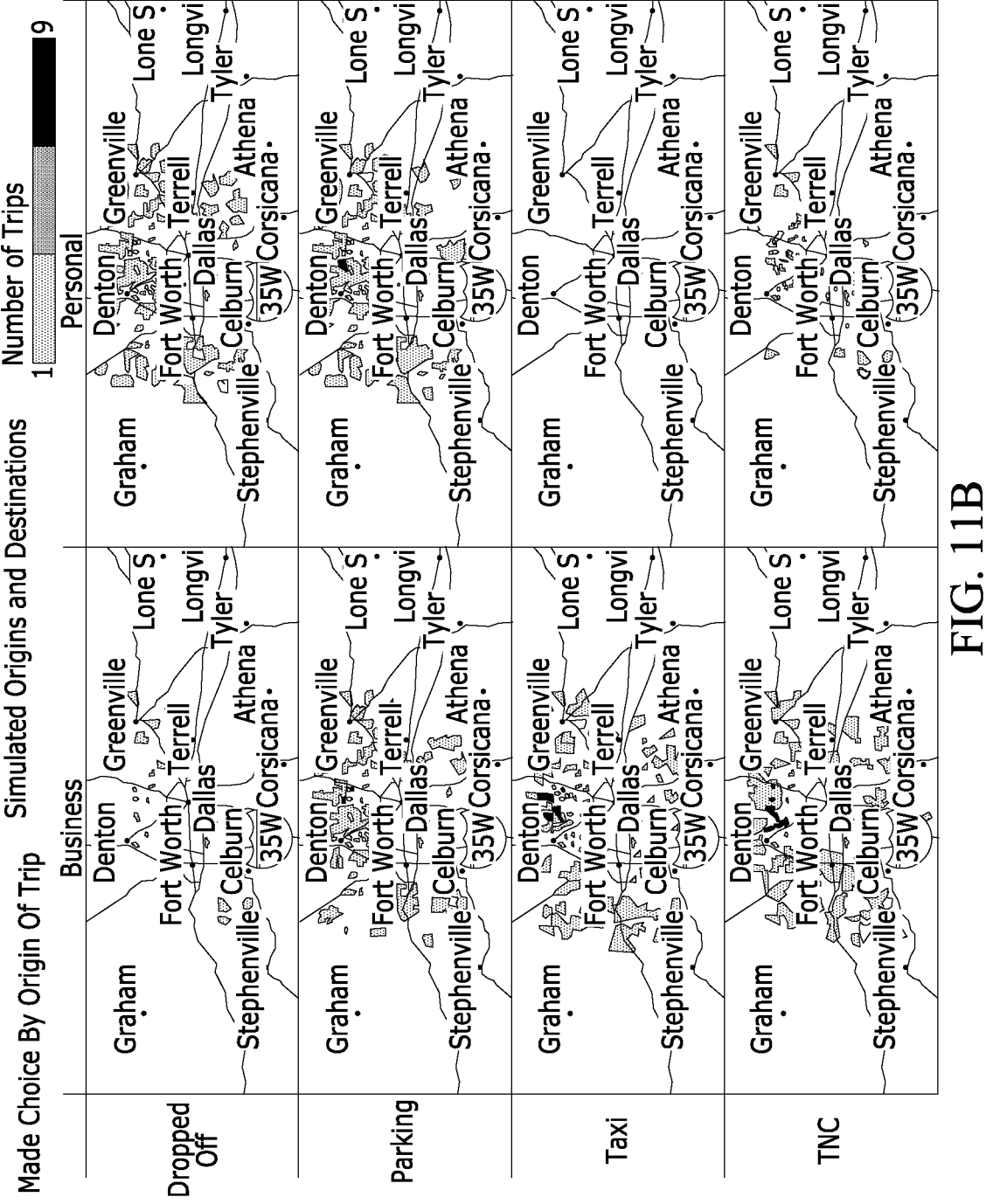
FIG. 11B illustrates a user interface of traveler origins by mode of transportation used to travel to an airport.
Figure 11C:
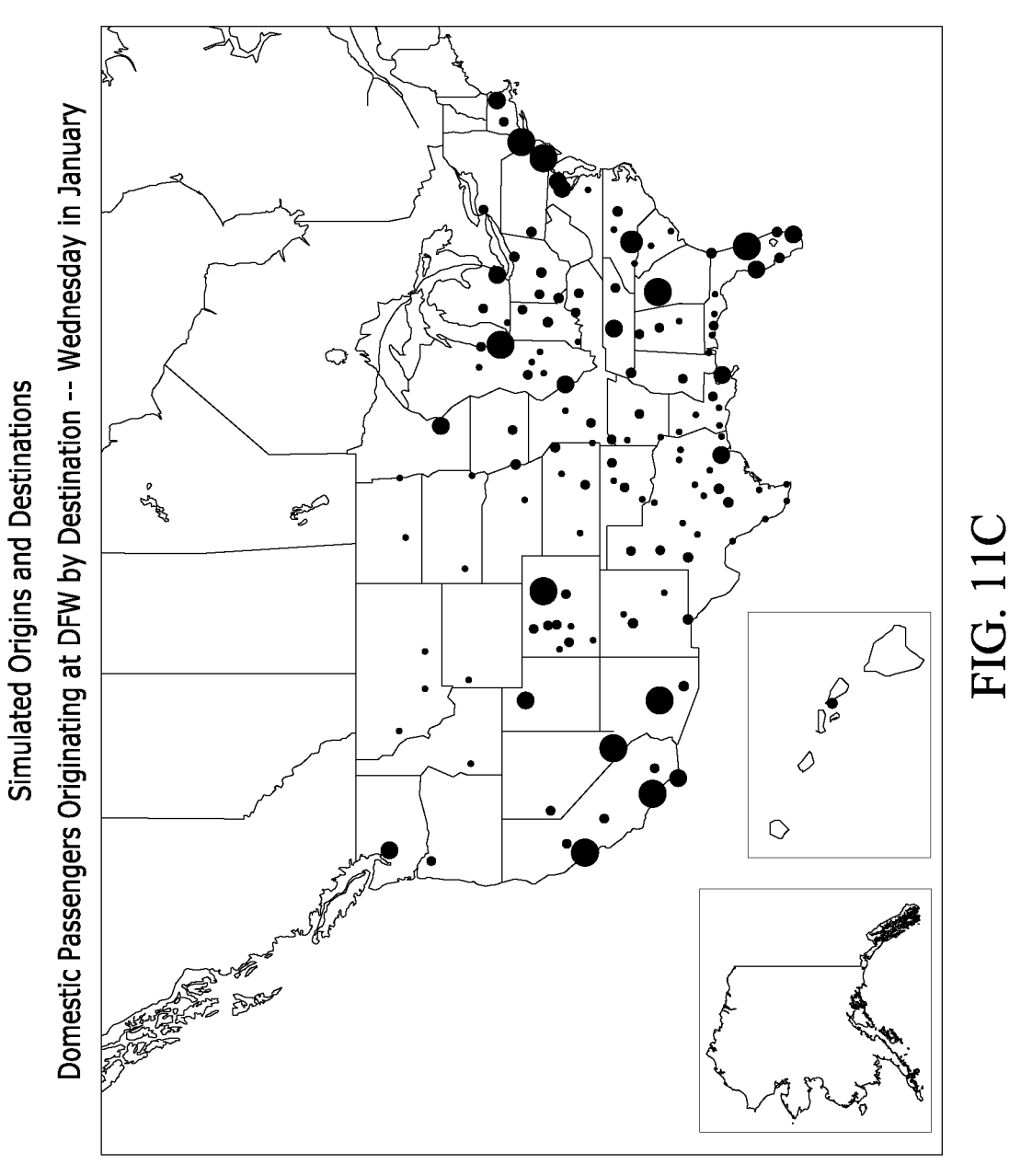
FIG. 11C illustrates a user interface of domestic traveler arrival destinations originating at the same departure airport on a single day.
Figure 11D:
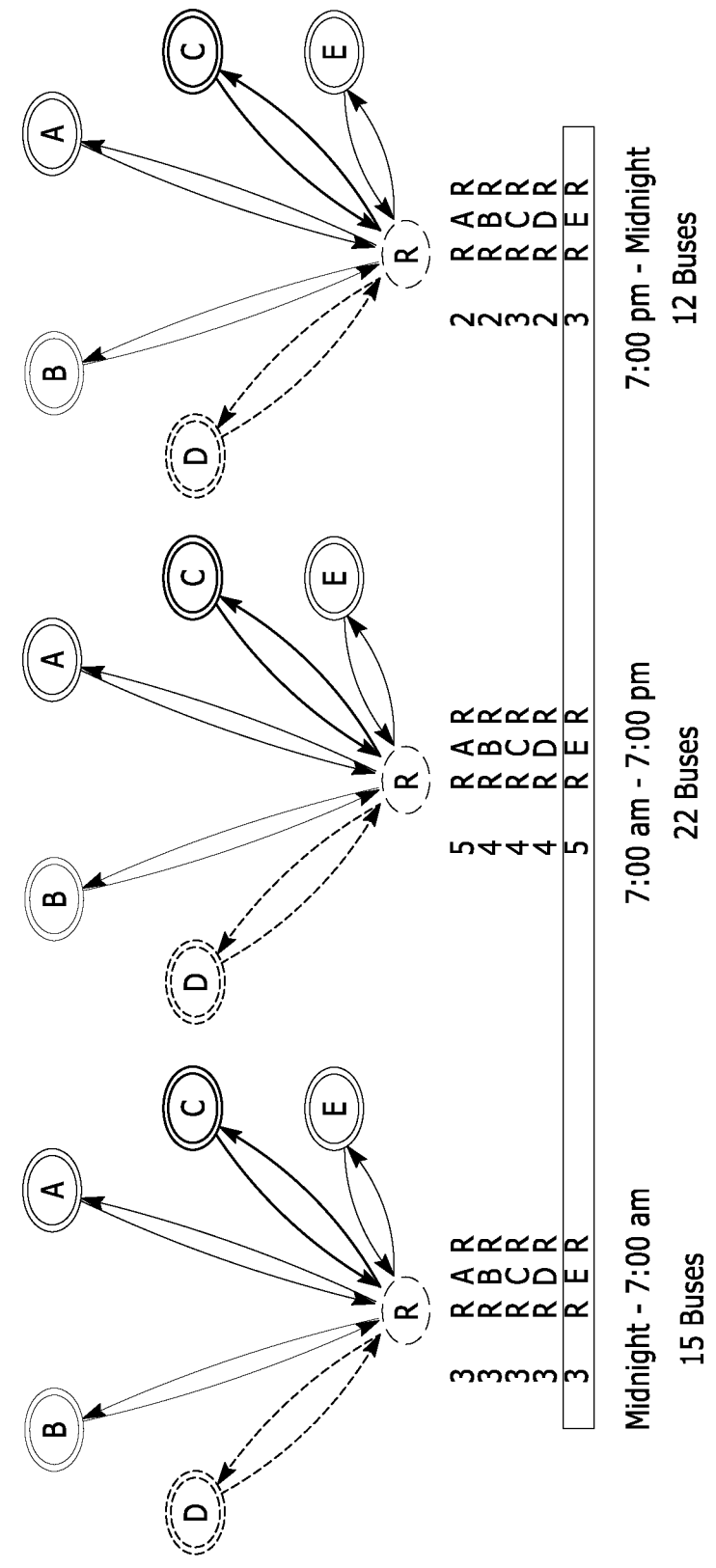
FIG. 11D illustrates a shuttle bus route for reassignment of different numbers of shuttles, according to embodiments of this disclosure.
Figure 11E:
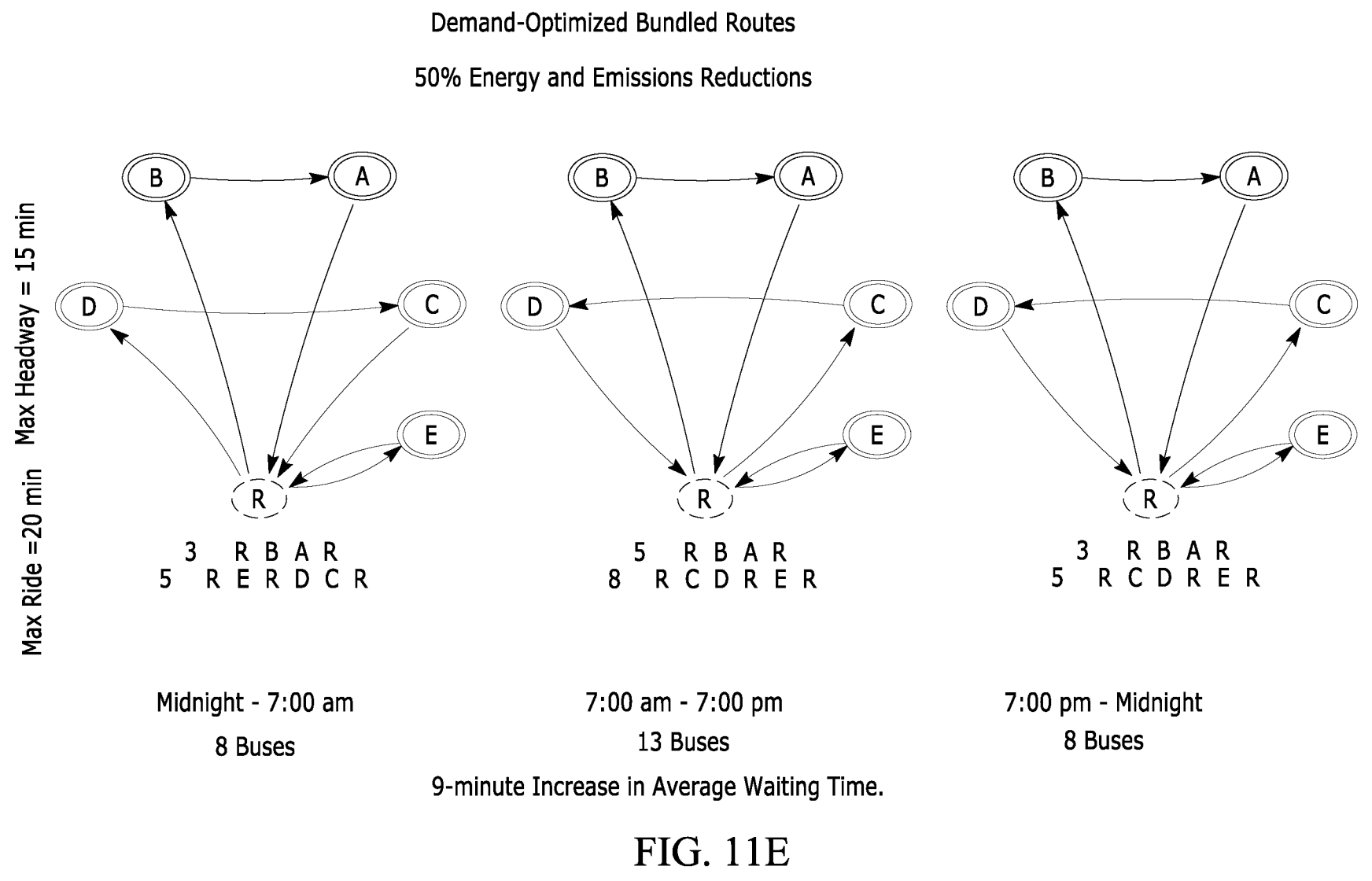

In certain embodiments, the conversion 1116 is also based in input data, such as population growth values in a local geographic region that contains trip origin locations of the people. For example, FIG. 11B shows an "Origins by Mode Type" user interface, which is generated by the DT 114, and which shows eight examples of a local geographic region defined by travel purpose (i.e., business or personal), by mode of transportation to the airport (e.g., dropped off, parking, taxi, or TNC) which may be included in the travel mode distribution 1112, and by origin (i.e., trip origin location; hotel; residence; workplace) where the person's trip to the airport began.

Based on the people information 1118, the generator function 1102 assigns 1120 boarding gates by outputting gate assignment information 1122. The gate assignment information 1122 can be based on a configuration or a user-selection to reduce peak power and energy consumption in the physical system (for example, in a specific terminal building 420 or a set of buildings 320). Particularly, to reduce peak power and energy consumption in the physical system, the generator function 1102 may perform a function to "encourage public transportation" or "schedule of shuttles," as shown in the list 800 of FIG. 8. For example, FIGS. 11D-11E shows that the DT 114 can optimize and modify existing shuttle bus routes to generate a result of 25-50% energy and emissions reductions.

Based on the gate assignment information 1122 and travel mode distribution 1112, the generator function 1102 predicts values 1124-1142 of how many people are likely to enter the boundary of the airport utilizing taxis, transit, limousine, rental car center, private vehicle, parking, or TNC, respectively. Further, the generator function 1102 includes a mode to route algorithm 1144 to generate a predicted route 1146 (including a predicted parking area) according to the modes of transportation values 1124-1142 for people destined to enter the terminal buildings corresponding to the gate assignment information 1122. In certain embodiments, a respective predicted route 1146 is generated for each of the people accounted for in the people information 1118. The microscopic simulation 1104 shows a graphical representation 1146*a* of a predicted route 1146 entering and exiting roads accessing terminal building A 1150. The DT 114 sends the microscopic simulation 1104, output from the generator function 1102, to a display device.

In certain embodiments, the DT 114 estimates a volume of people expected to be concurrently present inside a particular area (e.g., security area, gate area) inside a particular terminal building (e.g., terminal building A 1150). The DT 114 estimates a change in indoor air temperature inside a particular area based on a level of crowding or the estimated volume of people expected to be concurrently present inside the particular area. The DT 114 outputs a control signal to an HVAC controller for modifying a control parameter in order to maintain the indoor air temperature inside the particular area within a room temperature range. In certain embodiments, the DT 114 may selectively prioritize energy savings or prioritize maintaining a particular room temperature setpoint more than the other.

Although FIG. 11A illustrates one example of a generator function 1102, various changes may be made to FIG. 11A. For example, various components in FIG. 11A may be combined, further subdivided, replicated, omitted, or rearranged, and additional components may be added according to particular needs.

FIG. 12 illustrates an example of a digital twin-based method 1200 for reducing peak power and energy consumption in a physical system according to this disclosure. For ease of explanation, the method 1200 is described as involving the use of the DT 114 of FIG. 1, which may be used within the system 200 of FIG. 2. However, the method 1200 may involve the use of any other suitable device in any other suitable system.

As shown in FIG. 12, at block 1202, the DT 114 receives freight/cargo movement data. At block 1204, the DT 114 generates a demand forecast based on the received freight/cargo movement data. At block 1206, the DT 114 generates a microsimulation based on the demand forecast, which may overlay a street map. At block 1208, the DT 114 generates the metrics-based analysis results based on the microsimulation. The DT 114 outputs a user interface showing the metrics-based analysis results that are displayed via a display device. At block 1210, a list of policies and future scenarios are output by the DT 114, for example, displayed via a user interface.

More particularly at block 1202, the freight/cargo movement data 1212 can include freight routes data 604 and fleet analytics data 606. The freight/cargo movement data 1212 can be received from service-providing servers 210, such as from third party cargo carrier companies (e.g., UPS™), transportation analytics companies (e.g., INRIX™), airline companies (e.g., American Airlines™), or navigation companies (e.g., TomTom™).

More particularly at block 1204, the demand forecast 1214 generated by the DT 114 includes a predicted number of vehicles and a corresponding time of day at which the vehicles are expected to be in the physical system. Each predicted number of vehicles is based on a range of normality, a periodicity of time (such as a time of day/week/year), and the freight/cargo movement data 1212. The DT 114 obtains the range of normality (e.g., minimum, maximum, and average) for periodic measurements of a number of vehicles. For example, the range of normality may be based on historical measurements captured every 30 minute period per day over a span of 10 years. The user interface 1216 includes a shaded area representing the range of normality, which is labeled as "90% CI," indicating that 90% of the historical measurements are included in the range of normality and that the remaining 10% are outliers. The user interface 1216 includes a curve showing the actual value of the number of vehicles. The user interface 1216 includes a plot point representing each predicted value. Another area of the user interface 1216 shows a bell curve overlapping a bar graph, which represents the number of vehicles versus residuals.

More particularly at block 1206, the microsimulation simulates microsimulation data 1220 and may overly a street map 1218 of a local region (e.g., 10 mile radius around the airport) surrounding the physical system. The microsimulation data 1220 includes routes of freight/cargo vehicles, for example, a route per freight/cargo vehicle that is predicted to traverse within the physical system (e.g., airport). The microsimulation data 1220 includes a fuel efficiency per freight/cargo vehicle, which may account for volume/weight of cargo being transported. Per pairing of a freight/cargo vehicle and its route, the microsimulation data 1220 includes a corresponding emissions value due to cargo being transported along the routes, and a corresponding fuel consumption value.

More particularly at block 1208, based on the microsimulation data 1220, the DT 114 calculates costs 1222 (for example, investments), which may pay for the fuel consumption values, or air pollution equipment, or road maintenance/repair/upgrades. Also, based on the microsimulation data 1220, the DT 114 calculates impacts 1224 such as pollution values (for example, arrow 502 of FIG. 5). Further at block 1208, the metrics-based analysis results 1226 are generated based on the microsimulation data 1220, the impacts 1224, and a selected policy from among the list 1228 of policies and future scenarios.

More particularly at block 1210, an example list 1228 of user-selectable policies and future scenarios is displayed to a policymaker user. The list 1228 may be displayed and may receive user-input in a similar manner as the example list 800 of FIG. 8. When a first policy 1230*a* (illustrated as "No new policy—status quo") is selected, the DT 114 generates metrics-based analysis results 1226 corresponding to current conditions. When any from among the second through fifth policies 1232-1236 is selected, the DT 114 detects a policy change and generates metrics-based analysis results 1226 corresponding to the selected policy, which may include repeating the functions at blocks 1206-1208 according to the detected policy change. For ease of description, it is assumed that the policymaker user selects the second policy 1232 (illustrated as "Relocation of freight facility").

The DT 114 outputs the metrics-based analysis results 1226 as a user interface, which shows a fuel usage comparison graph, namely, a relationship between gallons of fuel (y-axis) versus each minute (x-axis) of a single day. In the user interface, a Peak Terminal hour 1238 (for example, 6:30-7:30 am) is shown in a shaded area; gallons saved 1240 by the selected policy 1232 are shown in a first color (green) as negative values; and gallons lost 1242 by the selected policy 1232 are shown in a second color (red) as positive values. For each policy in the list 1228 of policies and future scenarios, the DT 114 estimates a corresponding the metrics-based analysis results 1226 (e.g., Fuel Usage and Emissions due to Freight).

Although FIG. 12 illustrates one example of a method 1200 for reducing peak power and energy consumption in a physical system, various changes may be made to FIG. 4. For example, while shown as a series of steps, various steps in FIG. 4 may overlap, occur in parallel, occur in a different order, or occur any number of times. As a particular example, the functions at blocks 1208 and 1210 may generally operate in parallel, and their associated steps may therefore be performed in parallel.

Figure 13A:
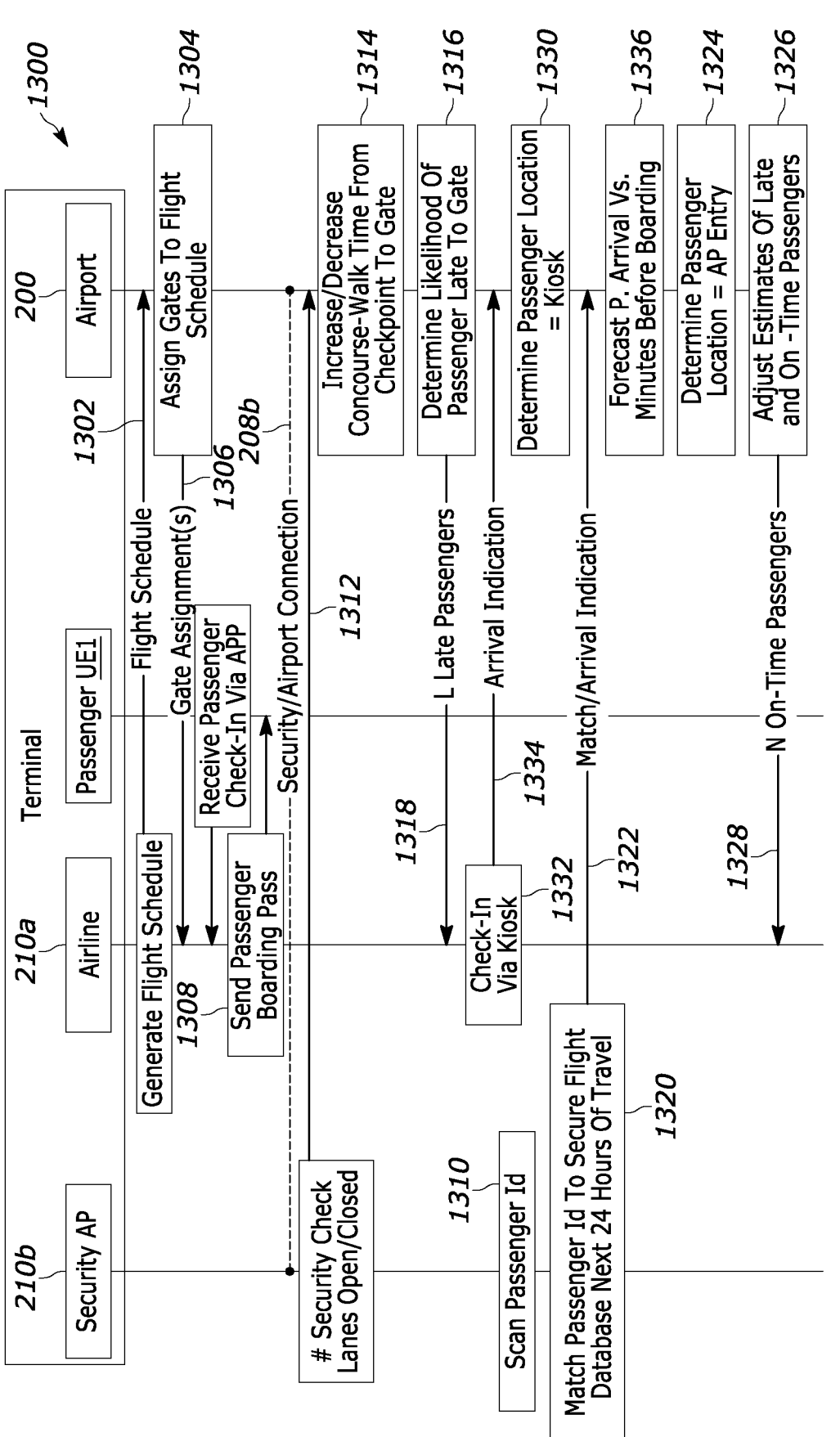
FIGS. 13A-13C (together FIG. 13) illustrate an example of a digital twin-based method for predicting a delayed departure of a transport vehicle based on traffic flow information in a physical system according to this disclosure.
Figure 13B:
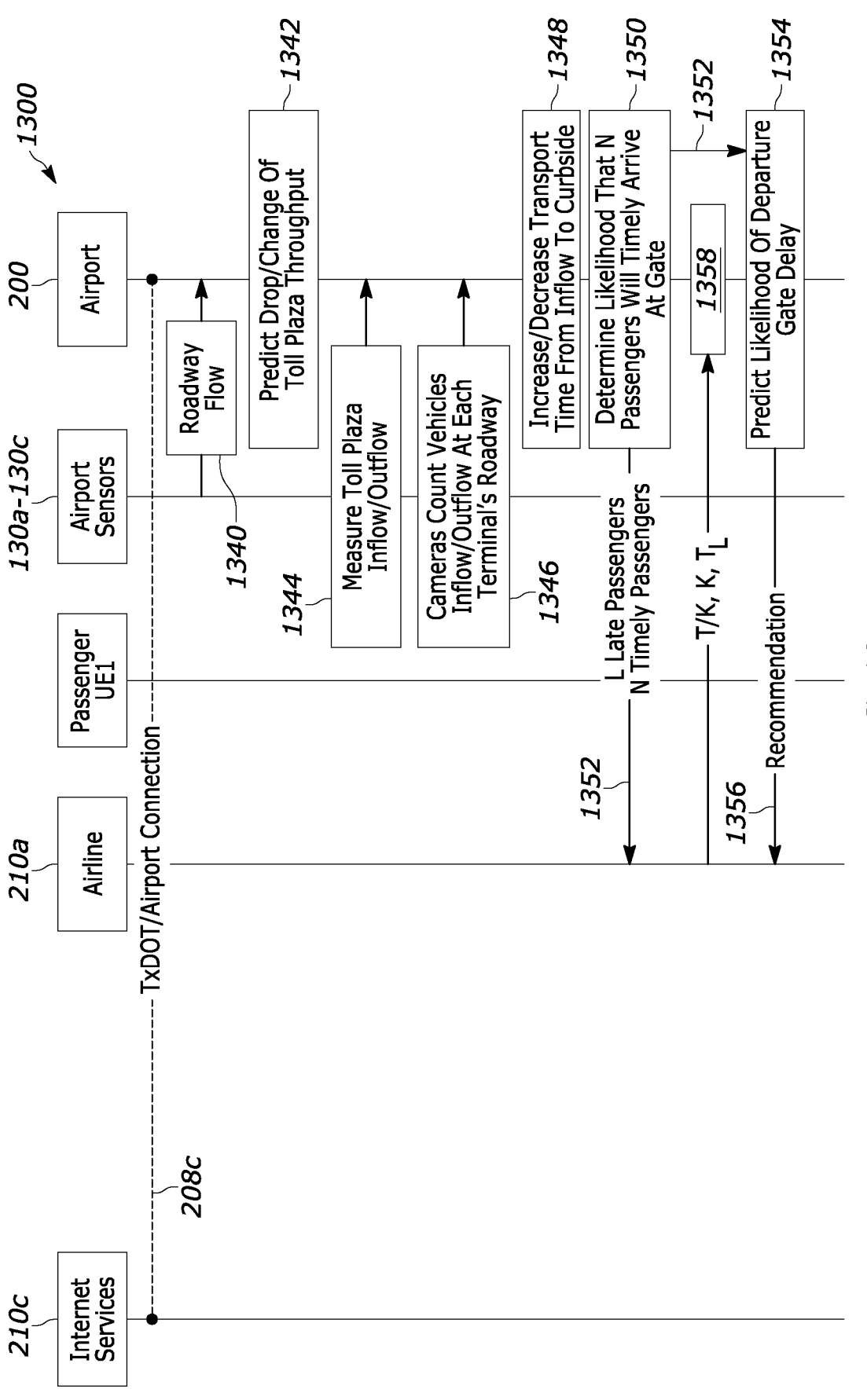
Figure 13C:
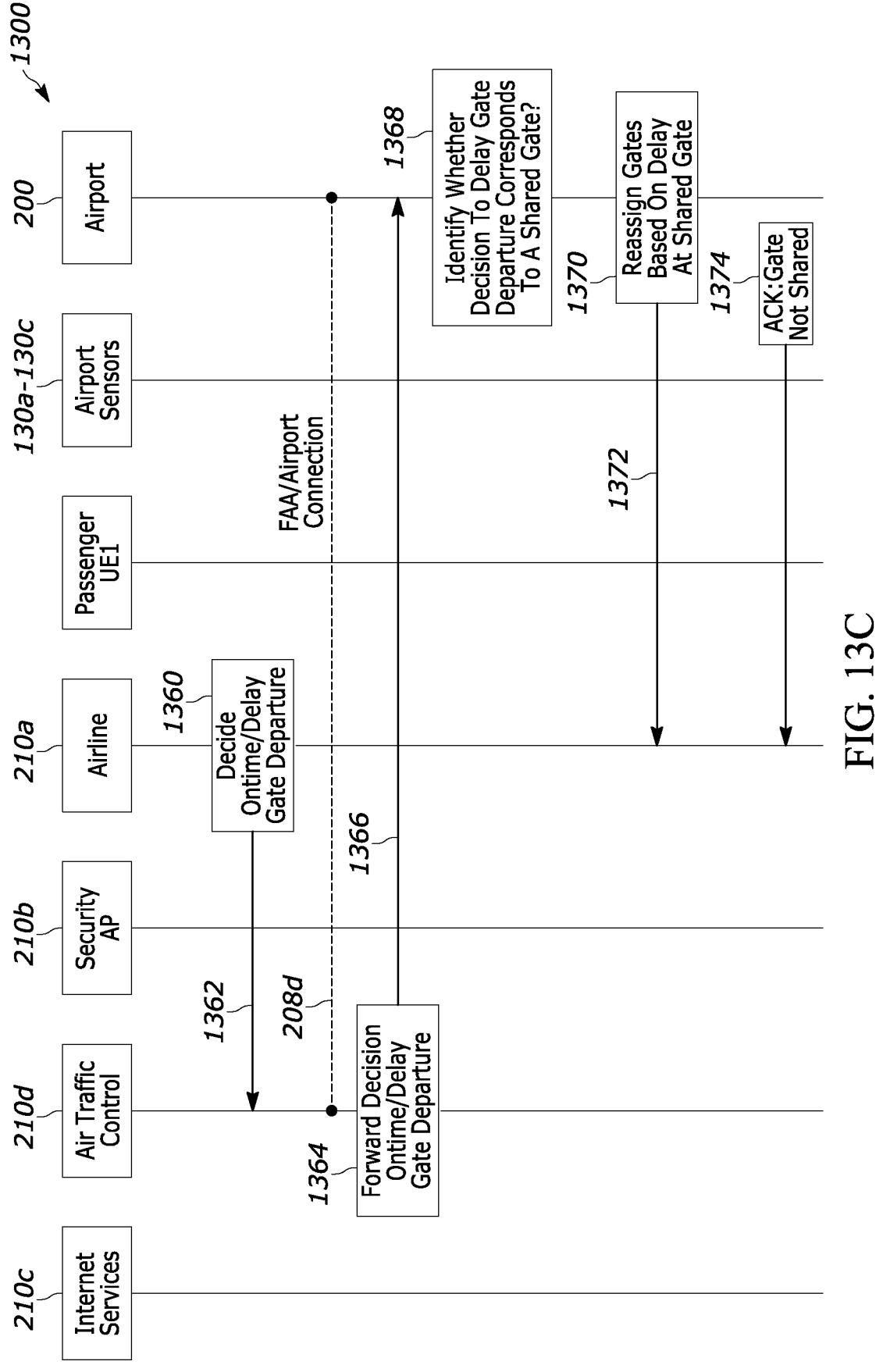

FIGS. 13A-13C (together FIG. 13) illustrate an example of a digital twin-based method 1300 for predicting a delayed departure of a transport vehicle based on traffic flow information in a physical system according to this disclosure. In FIG. 13A, the method 1300 includes analyzing information related to the first system 202 to predict the likelihood of a departure gate delay. In FIG. 13B, the method 1300 includes analyzing information related to the second system 204 to predict the likelihood of a departure gate delay. In FIG. 13C, the method 1300 includes determining whether to reassign gates based on an ON-TIME/DELAY decision for a departure gate. The embodiment of the method 1300 shown in FIG. 13 is for illustration only, and other embodiments could be used without departing from the scope of this disclosure. The method 1300 is implemented by an electronic device that includes at least one processor, such as the electronic device 100 with the processing device 102 executing the DTs 114 of FIG. 1, or the system 200 of FIG. 2. For ease of explanation, the method 1300 is described as being performed by the system 200 with processing devices executing the DTs 114a-114c of FIG. 2. In the description of FIG. 13, boarding time refers to an end of the scheduled boarding period.

It may be uneconomical for a carrier to operate a flight that has a load factor that is too low, which means that too many seats are empty or too much cargo space is empty. Sometimes, an airline company will decide to delay a flight in order to increase the load factor. For example, a decision to delay a flight can mean waiting to board late ticketed passengers who arrive after a boarding time. For example, an aircraft has a total of T seats including U unsold seats and S sold seats, the expected load factor is defined as S/T. The airline company knows that sometimes, the flight must leave on-time even though some of the sold seats remain empty (e.g., due to passenger illness or passenger tardiness) at boarding time. An on-time load factor is defined as K/T, where the aircraft will depart on-time if K passengers board the aircraft at or prior to the boarding time, and K is defined a $K=S-T_L$, where $T_L$ denotes an acceptable loss threshold number of empty seats that satisfies the an on-time load factor condition. The system 200 assumes that an aircraft will depart on-time if the on-time load factor condition is satisfied. The method 1300 enables the system 200 to predict a delayed departure of an aircraft if the number of late passengers (L) exceeds the loss threshold $T_L$ at the boarding time, and generates an increased likelihood that the airline company will decide to delay the flight. The decision for a delayed departure can cause the aircraft to burn jet fuel while parked and idling at the gate longer than originally scheduled, which means an increase of pollution inside the third physical area 206. a delayed departure of an aircraft based on a number (L) of late passengers exceeding. If prior to boarding time, the airline company receives and relies on likelihood information from the system 200 indicating there is a high likelihood that L passengers will be late, then the airline company can decide to convert L stand-by passengers into on-time passengers in order to satisfy the on-time load factor, for example, by providing boarding passes to the stand-by passengers physically located at the boarding location. That is, the likelihood information and prediction generated a part of the method 1300 can reduce pollution, increase on-time departures that improve traveler experiences, and reduce gate reassignments.

Referring to FIG. 13A, the system 200 receives at least one flight schedule 1302. Each of the multiple airline companies that utilize the third physical system 206 can own one or more service-providing servers 210a (for simplicity, referred to as airline 210a) used to generate and transmit the flight schedule 1302 to the system 200 via a network connection 208. The system 200 is communicably coupled with the airline 210a via network connection 208a. For ease of explanation, the flight schedule 1302 represents flights schedules received from the multiple airlines. The flight schedule 1302 can include flight specific information, and aircraft specific information and an airline ID indicating a source of the flight schedule. The aircraft specific information can specify a total number of passenger seats and a total cargo space. The flight schedule 1302 can include date of flight, flight ID (flight number), a timetable of scheduled departure times and arrival times, boarding time, departure airport, destination airport, etc.

At block 1304, the system 200 assigns boarding gates to each flight in the flight schedule 1302, and transmits the gate assignment information 1306 to the airline 210a. In some embodiments, the system 200 uses the generator function 1102 of FIG. 11A to generate the gate assignments 1306 based on the flight schedule 1302 received.

The airline sells inventory, including seats and cargo space, to their customers. A person who bought a ticket from the airline is referred to as a ticketed passenger for the particular flight ID linked to the ticket. The ticket reserves a seat and can reserve some amount of cargo space on the aircraft linked to the flight ID. The airline 210a includes a software application that enables ticketed passengers to check-in for a flight by using a user device UE1 approximately 24 hours before the scheduled departure time of the flight. In general, the ticketed passenger is not located in any of the physical systems 202, 242, 206 while checking in, but instead is located at home or at work. At block 1308, the airline 210a provides a boarding pass to the ticketed passenger in response to the check-in, for example, an electronic boarding pass sent to a mobile app on the UE1.

A security screening entity operates at least one security screening access point (AP) inside each of the terminal buildings 320, and can operate multiple security screening APs in per building 320. In general, the security screening entity is not owned by and is not controlled by the owner of the system 200. At the location of each security screening AP, the security screening entity conducts a primary security screening, followed by a secondary security screening. At block 1310, the security screening entity conducts the primary security screening by using a scanner device that scans a boarding pass or a photo ID of a person. The security screening entity can operate multiple scanner devices at the same primary security screening location. In the database 132, the location of each security screening AP can be linked to an ID of the security screening AP and linked an ID of the scanner device. To distinguish multiple access points from each other that are in the same building, the location of each security screening AP can specify the building and a specific area inside of the building (for example, Northside of Terminal A or Southside of Terminal A).

After the photo ID has been scanned by the scanner device, the security screening AP includes one or multiple lanes that ticketed passengers pass through for undergoing the secondary security screening (e.g., screening of carry-on bags). The location at which the scanner device scans the photo ID can be referred to as the entrance to the secondary security screening lanes. The location at which the secondary security screening is completed is referred to as the exit of the secondary security screening lanes or the exit of security screening AP. The security screening entity owns one or more service-providing servers 210b (for simplicity, referred to as security AP 210b) that tracks information 1312 including the location of and ID of each security screening AP, and the corresponding number of secondary security screening lanes that are OPEN and a number of lanes that are CLOSED at each security screening AP. The system 200 receives the information 1312 from the security AP 210*b* via a network connection 208*b*.

At block 1314, the system 200 adjusts a travel time from a primary security screening location of a particular security screening AP to a particular boarding location (e.g., boarding gate) inside the first physical system 202, based on the information 1312. For example, the database 132 stores a travel time from the security scanner device located at the Southside of Terminal A to each boarding gate inside the Terminal A building, respectively. Analogously, for each boarding gate inside the Terminal A building, the database 132 stores another travel time from the security scanner device located at the Northside of Terminal A. In some embodiments, the adjustment to travel time is obtained from a lookup table (LUT). In this example, the LUT is part of the DT 114, but in other embodiments, the LUT can be stored in the database 132. The database 132 can store an average walk time from the exit of the secondary security screening lanes of a particular security screening AP to a particular boarding location, which can be values that do not vary based on the number of lanes that are open at a security screening AP. The LUT can include the number of secondary security screening lanes that are open at a particular security AP, and a relationship to a secondary screening time it takes for a person to pass through those open lanes (i.e., extending from the scanner device to the exit of the secondary security screening lanes). In this LUT, an increase in the number of lanes OPEN is directly related to a decrease in the secondary screening time it takes a person to pass through the secondary screening lanes. That is, to adjust the travel time, the system 200 obtains the average walk time in the database 132 and combines it with the secondary screening time obtained from the LUT. In other embodiments, the travel time from the security AP scanner device to a particular boarding location is expressed as a function that varies according to the number of lanes that are OPEN at the security screening AP located at the Northside and the Southside, respectively. In this function, an increase in the number of open lanes is related to a decrease in the travel time from security check to each of the boarding gates, respectively, and a decrease in the number of open lanes is related to an increase in the travel times.

At block 1316, the system 200 determines a likelihood that passengers will be late to their boarding locations, based on information 1312 including the number of secondary security lanes that are OPEN. More particularly, the system 200 can estimate a number (L) of ticketed passengers who are likely to reach their boarding locations too late, namely, after the boarding time. The system 200 can transmit likelihood information 1318 including L as the estimated number of late passengers to the airline 201*a*. For example, the security screening APs in the Terminal A building are closed, and if the gate assignment 1306 remains unchanged, then it is likely that a majority of the ticketed passengers seeking to access a boarding gate inside Terminal A enter Terminal A before realizing that a detour to a different building (e.g., Terminal C) is necessary to find a security screening AP that is open. Similarly, if the number of secondary security lanes that are OPEN is too low for a terminal building 320, then an increased number of passengers will reach their boarding locations too late.

At block 1320, the security AP 210*b* receives passenger ID information associated with the photo ID card that the security scanner device scanned. For example, the passenger ID information includes the full name of the passenger, data of birth, and sex. The security AP 210 includes a secure flight database in which carrier-provided passenger ID information is linked flight details for ticketed travel that day (e.g., in the next 24 hours). The security AP 210 determines whether the passenger ID information received from the security scanner device corresponds to (e.g., matches) passenger ID information stored in the secure fight database, and if so, transmits a passenger arrival indication 1322 to the system 200. For simplicity, the passenger arrival indication 1322 is referred to as match indication 1322. The match indication 1322 can include a flight ID and a number of passengers (e.g., number of boarding passes) that correspond to the passenger ID information. For example, secure flight database can link the passenger ID information of an adult to flight details for children who are accompanied by that adult. In this embodiment, the system 200 avoids receiving the passenger ID information, as the match indication 1322 does not include passenger ID information. Similarly, the airline 210*a* and the security 201*b* are able to update the secure flight database without sending the passenger ID information to the system 200. In some embodiments, the system 200 receives a match indication 1322 each time that the scanning of a photo ID card (or boarding pass) by a security scanner device causes the security AP 210*b* to determine that a corresponding passenger ID information is stored in the secure fight database.

At block 1324, the system 200 determines or otherwise ascertains that the number of passengers corresponding to the match indication 1322 have the same physical location as the security scanner device at block 1310. Based on the flight ID corresponding to the match indication 1322, the system 200 identifies a corresponding boarding location based on the gate assignment 1306 and identifies a corresponding boarding time based on the flight schedule 1302. Based on the identified boarding location, the system 200 identifies a corresponding concourse-walk time that was determined at block 1314, and computes an estimated time of arrival (ETA) based on the current time added to the corresponding concourse-walk time.

At block 1326, the system 200 increments a count of N on-time passengers for the flight ID corresponding to the match indication 1322, based on a determination that the ETA computed at block 1324 is equal to or prior to the boarding time that corresponds to the match indication 1322. On the other hand, if the ETA is after the boarding time, then the system 200 updates the estimate of L late passengers to include the number of passengers corresponding to the match indication 1322. That is, when a person undergoes the primary security screening, the system 200 transmits likelihood information 1328 to the airline 210*a* notifying that the flight ID corresponding to the match indication 1322 is likely to have N on-time passengers and L late passengers.

In some embodiments, as shown at block 1330, the system 200 can determine that the physical location of a ticketed passenger is at the location of a self-service kiosk inside the building. Inside a terminal building, the airline 210*a* can include a kiosk that enables a ticketed passenger to check-in for a flight by using a photo ID scanner or inputting a ticket ID (e.g., carrier-provided confirmation number), as shown at block 1332. The kiosk includes a computer screen, a photo ID scanner, payment card reader, and a printer. In response to completing the check-in at the kiosk, the airline 210*a* can send a passenger arrival indication 1334, including the location of the kiosk and the flight ID corresponding to the ticket ID, to the system 200.

The database 132 tracks the number of minutes before boarding time of a flight that a kiosk-based passenger arrival indication 1334 is received from the airline 210*a* or that an AP-based passenger arrival indication 1322 is received from the security 210*b*, which enables the second DT 114*b* to generate a passenger arrival forecast 1336. From a sampling of flight IDs over a historical period, a graph can be produced from the database 132 such that the x-axis includes each minute within the 24 hours prior to boarding time, and the y-axis includes an amount of ticketed passengers for the particular flight ID. The y-axis can represent a fraction of sold seats, a fraction of total seats on the aircraft, a fraction of total match indications 1334 received for a particular departure flight. A statistical analysis can be performed on this graph to obtain one or more trend functions, which can be the passenger arrival forecast 1336. The trend function provides a ratio of ticketed passenger who arrive a given number of minutes before/after the corresponding boarding time. The passenger arrival forecast 1336 can be generally applicable for any of the flights that depart from third physical system 206, or different passenger arrival forecasts can be generated based on similarities of the samplings and applicable to a subset of flights having the similarities. After block 1330, the system 200 can use the second DT 114*b* to generate likelihood information (similar to the likelihood information 1318) by estimating L late ticketed passengers who are likely to reach their boarding locations too late, based on the passenger arrival indication 1334 received from the airline 210*a* and the passenger arrival forecast 1336 applied. Such likelihood information can be generated with or without the match indication 1322.

To estimate L, the system 200 can receive an estimated wait time for a queue that ends at the primary security screening location of a particular security AP located inside the first physical system 202. For example, the estimated wait time can be determined by the DT 114*a* based on data received from camera sensors 130*a* or IoT devices 136*a* that monitor the queue, or received from a third-party server 210 that generates the estimated wait time based on crowd-sourced data. For example, L late ticketed passengers may increase if the estimated wait times for each of the multiple security APs inside the building are too long, or if too few security check lanes are open. Based on the time at which the passenger arrival indication is generated by the airline 210*a* and the forecasted passenger arrival schedule, the system 200 can use the second DT 114*b* to determine a likelihood that L ticketed passengers will to reach their boarding locations after the boarding time for the flight ID corresponding to the ticket ID.

Also, the system 200 can compute an estimated time of arrival (ETA) based on the current time, the estimated wait time for the queue that ends at the primary security screening location of a particular security AP, and a concourse-walk time from the particular security AP to the boarding location corresponding to the ticket ID. However, when both passenger arrival indications (i.e., kiosk-based and AP based) are received, the system 200 can generate a likelihood information 1328 that is more accurate. In some embodiments, the system 200 increments the count of N on-time passengers for the flight ID corresponding to the kiosk-based passenger arrival indication 1334, based on a determination that the ETA (i.e., computed at least partially based on the estimated wait time for the queue that ends at the primary security screening location) is equal to or prior to the boarding time for that flight ID.

The method 1300 continues to FIG. 13B, wherein system 200 analyzes information related to the second system 204 to predict the likelihood of a departure gate delay. By way of comparison to FIG. 13A, the system 200 establishes a network connection 208*c* to one or more service-providing servers 210*c* and is thereby able to receive road condition information about regional roads that are external to the second system 204. Road condition (e.g., under construction, road closure, impassibly congested) of regional roads effect on the rates of road vehicles that are able to enter and exit the road (e.g., road 702 of FIG. 7) in the second system 204.

The system 200 receives roadway traffic flow information 1340 from sensors 130*b* associated with the sections of road in the second system 204. At block 1342, the system obtains a prediction that the number of automobiles entering or exiting the second system 204 (e.g., toll plaza throughput) will change (e.g., drop). To obtain this prediction, the second DT 114*b* system 200 can be trained to recognize certain conditions that previously caused a noteworthy change to the number of automobiles that are able to enter or exit the second system 204. For example, the second DT 114*b* can recognize that such a condition is satisfied if a regional interstate road that feeds into the second physical system 204 includes a road closure condition associated with a section of road within a specified distance from the boundary (e.g., boundary 310 of FIG. 3). To recognize such conditions, the second DT 114*b* can access a LUT that lists highways or interstates that normally feed a large amount of road vehicles into the second system 204. Also, the second DT 114*b* can access a LUT that lists expected toll plaza throughput and a corresponding traffic speed or other traffic measurements expected from the sensors 130*b*.

At block 1344, traffic counter sensors 130*b* measure and transmit traffic flow information to the system 200 (for example, to the second DT 114*b*), including measurements of the actual toll plaza throughput or speed as a function of time. At block 1346, traffic camera sensors 130*b* detects and transmits traffic flow information to the system 200 (for example, to the second DT 114*b*), including a count of vehicles taking a route into and a route out of each roadway to each terminal building.

At block 1348, the system 200 uses the second DT 114*b* to adjust a travel time of a route from an entrance of the physical system 204 to a curbside of a building, for example, from a toll plaza (displayed in FIG. 7 as toll plaza 708) entrance to curbside of the Terminal A building. The procedure performed at block 1348 is analogous to the procedure performed at block 1314 of FIG. 13A. The database 132 stores drive time associated with a predefined route from a particular entrance of the physical system 204 (e.g., a particular toll plaza) to a curbside of a particular building, which can be values that vary based on the number of lanes or sections of road that are open between these two locations, and based on the speed of travel via these lanes or sections of road included in the predefined route.

At block 1350, the system 200 determines a likelihood that N timely passengers will arrive timely at their boarding locations on time, respectively. The system 200 can also determine a likelihood that L late passengers will arrive at the boarding location after the boarding time. The system 200 transmits likelihood information 1352 to the airline 210*a*, including the likelihood of N timely passengers and likelihood L late passengers.

At block 1354, the system 200 predicts a likelihood that a flight ID will be delayed, based on the likelihood information 1352. To make this determination, the system 200 obtains parameters 1358 for the on-time load factor (e.g., a threshold minimum passenger load factor) and for K (e.g., a threshold minimum number of non-empty seats). Particularly, if N timely passengers (obtained from likelihood information 1352) is greater than or equal to the threshold value K, then the on-time load factor is satisfied, and the system 200 predicts that the flight ID will depart on-time. If L late passengers (obtained from likelihood information 1352) exceeds the loss threshold $T_L$, then the on-time load factor is not satisfied, and the system 200 predicts that the flight ID will have a delayed departure. To help the airline company maintain a flight ID in the on-time status, the system 200 transmits a recommendation 1356 to the airline 210a, based on whether the on-time load factor is satisfied. If the on-time load factor is not satisfied, sends the recommendation 1356 including a message notifying that the on-time load factor will not be satisfied at the boarding time, and recommending that standby travelers be converted to ticketed passengers in order fill the seats currently reserved for the L late passengers. The recommendation 1356 can be displayed at a computer screen associated with an employee of the airline company authorized to make a decision to delay a flight versus to depart on-time while the on-time load factor is not satisfied. The airline company can read the recommendation 1356 received by the airline 210a and begin allowing standby travelers to fill the L seats prior to the boarding time, and thereby increase the actual load factor. If at least L standby travelers fill the seats reserved for the L late passengers, then the on-time load factor can be met and the flight ID can have an on-time departure from the boarding gate.

In some embodiments, if the on-time load factor is not satisfied, then the system 200 can obtain the ETA corresponding to each of the L late passengers who are associated with an arrival indication 1334, 1322. The system 200 can generate a message notifying that if the flight is delayed by a specified number of minutes (defined according to the obtained ETAs), then a specified portion of the L late passengers will be able to reach the boarding location and board the aircraft within the specified number of minutes. For example, the recommendation 1356 can say "If this flight is delayed by 10 minutes, then 5 out the 7 late passengers will be able to board," wherein the ETA for 5 late passengers is 10 minutes or less, but the ETA for 2 late passengers is the greatest ETA among the L=7 late passengers. If the on-time load factor is satisfied prior to the scheduled boarding time, then the recommendation 1356 includes a message recommending on-time departure.

Referring to FIG. 13C, the method 1300 continues. At block 1360, the airline company notifies Air Traffic Control (ATC) via a communication to 210d of a decision whether a gate departure for particular flight ID will have an on-time status or a delay status. In some scenarios, the airline company is not required to notify the airport of this decision for delay status, but is required to notify the ATC. For example, the airline 210a sends a decision notification 1362 including the delay status for the flight ID to a server system 210d (hereafter ATC 210d) associated with the Air Traffic Control.

According to embodiments of this disclosure, the system 200 establishes a network connection 208d with the ATC 210d. At block 1364, ATC 210d transmits, to the system 200 via the network connection 208d, a forwarded decision notification 1366 that corresponds to the decision notification 1362. More particularly, by receiving the forwarded decision notification 1366, the system 200 is able to identify that the decision notification 1362 included the decision for a delay status decision for the particular flight ID. If the ATC does not send the forwarded decision notification 1366, then a latency occurs until the system 200 receives information from a third-party service 210c indicating the delay status decision for the particular flight ID. Such latency could have a negative effect on operations of another airline company if the particular flight ID corresponds to a shared gate. If the system 200 receives the forwarded decision notification 1366 contemporaneously relative to when the airline 210 transmitted the original decision notification 1362, then without latency, the system 200 is able to reassign gates based on the delay at the shared gate, and transmit a new gate assignment to other airlines affected by the delay.

At block 1368, the system 200 identifies whether the decision to delay gate departure for the particular flight ID corresponds to a shared gate. For example, exclusive boarding gates are subject to a lease agreement in which a single airline company obtains exclusive rights to use the gate, but shared boarding gates are subject to one or more lease agreements in which multiple airline companies share rights to use the gate. An airline company's decision to delay a flight corresponding to an exclusive gate can trigger the airline company to perform gate reassignment. However, airline company's decision to delay a flight corresponding to a shared gate can trigger the system 200 to perform gate reassignment. The database 132 stores a list of all boarding gates in the first system 202, and a list of tenants per boarding gate.

At block 1370, the system 200 accesses the current gate assignment schedule to determine whether to perform gate reassignment. If the delay decision for the particular flight negatively affects a cotenant of the shared gate, then the system 200 performs gate reassignment and transmits the updated gate assignment 1372 to the airline 210a. If the delay decision corresponds to an exclusive gate, then the system 200 can send an acknowledgement 1374 of the delay decision to the airline 210a.

Although FIG. 13 illustrates an example digital twin-based method 1300 for predicting a delayed departure of a transport vehicle based on traffic flow information in a physical system various changes may be made to FIG. 13. For example, while shown as a series of steps, various steps in FIG. 13 could overlap, occur in parallel, occur in a different order, or occur any number of times.

Figure 14:
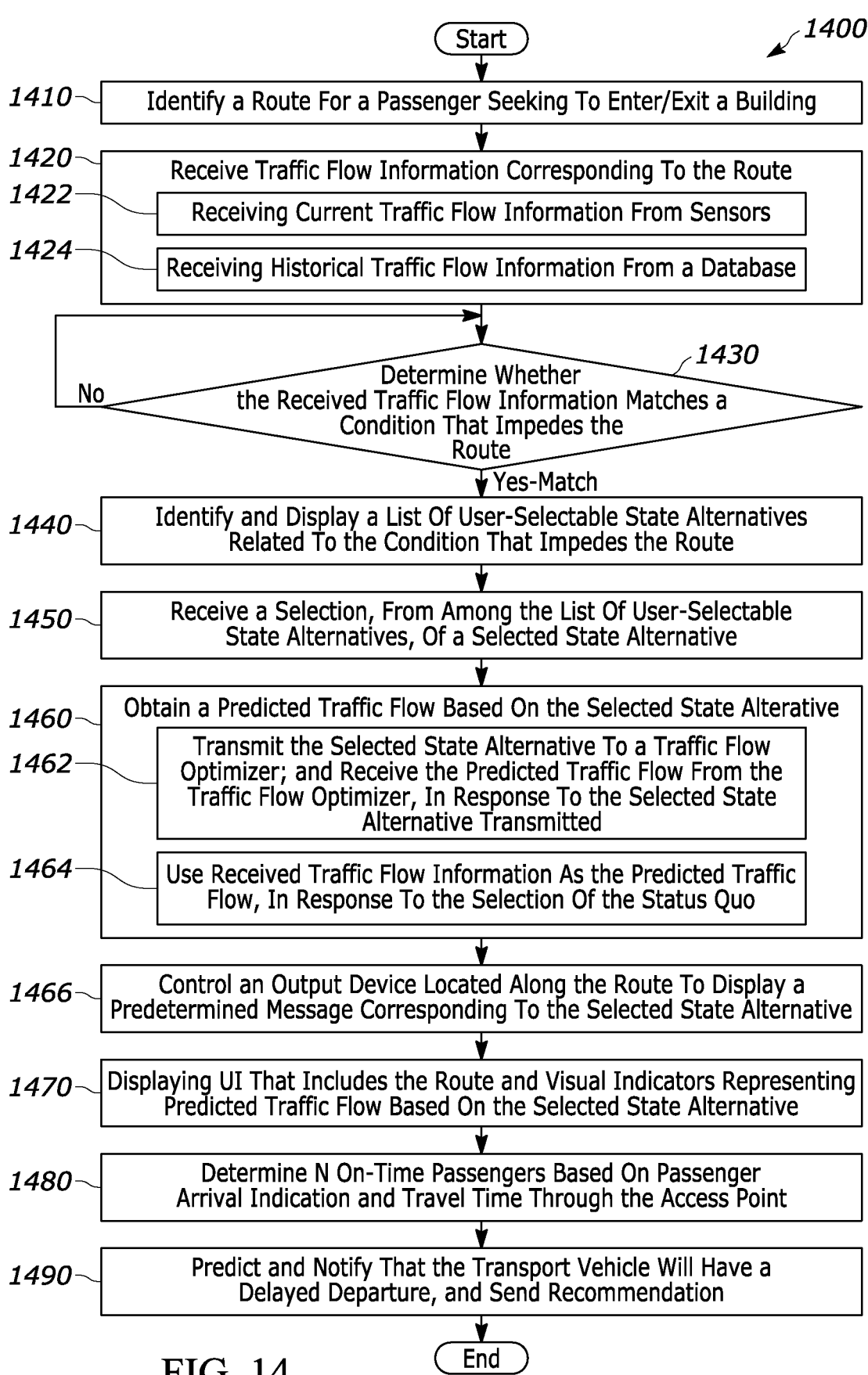
FIG. 14 illustrates an example digital twin-based method for predicting traffic flow information based on a selected alternative for redirection of the traffic flow in a physical system.

FIG. 14 illustrates an example digital twin-based method for predicting traffic flow information based on a selected alternative for redirection of the traffic flow in a physical system, according to embodiments of this disclosure. The embodiment of the method 1400 shown in FIG. 14 is for illustration only, and other embodiments could be used without departing from the scope of this disclosure. The method 1400 is implemented by an electronic device that includes at least one processor, such as the electronic device 100 with the processing device 102 executing the DTs 114 of FIG. 1, or the system 200 of FIG. 2. For ease of explanation, the method 1400 is described as being performed by the electronic device 100 with processing device 102 executing the DTs 114a-114c of FIG. 2.

At block 1410, the processing device 102 identifies a route for passengers seeking to enter a building. In some embodiments, the entire route is included with the first system 202 and the second system 204. The route includes at least one section of road for automobiles to access a building, or at least one access point inside the building for pedestrians to pass through. For example, as shown in FIG. 8, the route can include a multiple-lane section (812 and 814) of road for automobiles to access Terminal A building. The least one access point of the route can include a security access point inside Terminal A building, which includes the secondary security screening lanes that ticketed passengers pass though from a public area to a restricted area.

At block 1420, the processing device 102 receives traffic flow information corresponding to the route. At block 1422, the processing device 102 receives the traffic flow information corresponding to the route by receiving current traffic flow information from sensors 130*b* that detect phenomena on the route. For example, as described with FIG. 9, block 1422 represents an operational embodiment of the second DT 114*b*, and block 1424 represents a training embodiment of the second DT 114*b*. Block 1424, the processing device 102 receives the traffic flow information corresponding to the route by receiving historical traffic flow information from a database 132. The historical traffic flow information can be an input condition that is input to a traffic flow optimizer 138 to train the optimizer 138.

At block 1430, the processing device 102 determines whether the received traffic flow information corresponds to a condition that impedes the route. The second DT 114*b* includes a set of pre-trained conditions (e.g., a list of known conditions) that impedes the route, such as impeding the at least one section of road for automobiles to access the building. The first DT 114*a* includes a set of pre-trained conditions that impedes the route, such as impeding the at least one access point inside the building for pedestrians to pass through. The DTs 114*a*-114*c* are trained to analyze the traffic flow information received, to recognize patterns corresponding to any of the set of pre-trained conditions known to impede the route. For example, the lane closure shown at 812 of FIG. 8 is a condition that impedes the route to Terminal A, and the second DT 114*b* is trained to recognize lane closures as condition that impedes a section of road, from among the set of pre-trained conditions. According to this disclosure, the list of conditions is known by the DTs 114 due to training conditions used to train the DTs 114, but are not generally known. From among the set of pre-trained conditions, a closed security access point is a condition that impedes the route for passengers who not only seek to enter the building, but also seek to pass through the access point to walk to a boarding location inside the building. A security incident, such as an active shooter situation, is another condition that the DTs 114 are trained to recognize as impeding the route, from among the set of pre-trained conditions.

At block 1440, the processing device 102 identifies and controls a display to display a list of user-selectable state alternatives related to the condition that impedes the route, based on a determination that the received traffic flow information corresponds to the condition. In some embodiments, a first state alternative corresponds to a status quo, from among the list of user-selectable state alternatives.

At block 1450, the processing device 102 receives a selection, from among the list of user-selectable state alternatives, of a selected state alternative. For example, the selection can be obtained from user input to the list 800 of FIG. 8, or the list 1228 of FIG. 12.

At block 1460, the processing device 102 obtains a predicted traffic flow corresponding to the route, based on the selected state alternative. In some embodiments as shown at block 1462, the processing device 102 obtains the predicted traffic flow by: transmitting the selected state alternative to a traffic flow optimizer 138; and receiving the predicted traffic flow from the traffic flow optimizer 138, in response to the selected state alternative transmitted.

As shown at block 1464, in a case when the selected state alternative is the first state alternative that corresponds to the status quo, the processing device obtains the predicted traffic flow by using the received traffic flow information as the predicted traffic flow. In other words, when the selected state alternative is the first state alternative, the predicted traffic flow is the same as the actual traffic flow of the route, and is not different from current traffic flow information received from sensors 130*b* that detect phenomena on the route.

At block 1466, the electronic device 100 enables a policymaker to take action to attempt to mimic the predicted traffic flow. More particularly, the processing system 102 is further configured to control an output device (or multiple output devices) located along the route (e.g., installed at sections of road in the second system 204 and installed inside the building) to display a predetermined message corresponding to the selected state alternative. In this disclosure, the term "output device" is used for simplicity of description, but examples of such output device includes: a traffic information sign to direct vehicular traffic, or a passenger information sign to direct pedestrian traffic. The predetermined message is associated with at least one of: the condition that impedes the route; or a change of mode of transportation. For example, if the selected state alternative is the third alternative ("Balance traffic between terminals") as shown in the list 800 of FIG. 8, and if a policymaker user selects (e.g., inputs a command) to mimic predicted traffic flow, then a predetermined message can say "Terminal A curbside Lane Closed," which message is associated with the condition. That predetermined message can further say "Terminal A Passengers drop off at any other Terminal. Ride Inter-Terminal rail to Terminal A. Security wait time is 3 minutes at Terminal E and 10 minutes at Terminal C," which message is associated with a change of mode of transportation (e.g., changed to add rail). Passengers in automobiles seeking to access Terminal A can choose to instead drop off at a curbside of a different building (Terminal B, C, D, or E), so that ticketed passengers can pass through a security access point in the different building, and then ride the rail to the boarding gate in Terminal A. Passengers in automobiles seeking to access Terminal A can still choose to join the congestion caused by the vehicle lane closure 814 and still drop off using the other lane (812) remaining open at a curbside of Terminal A.

At block 1470, the processing device 102 controls a display to display a user interface that includes the route and visual indicators representing the predicted traffic flow based on the selected state alternative. For example, in response to the first state alternative (e.g., status quo) being selected, the electronic device displays a user interface that includes the route and visual indicators representing the traffic flow information corresponding to the route.

At block 1480, the processing device 102 determines N as a number of on-time ticketed passengers, based on at least one passenger arrival indication 1322, 1334 and a travel time through the at least one access point (e.g., secondary security screening lane) of the route. For example, as shown at block 1314 of FIG. 13A, the secondary screening time is an example of the travel time through the at least one access point of the route, which can be obtained from a LUT.

To determine N, the processing device 102 receives at least one passenger arrival indication 1322, 1334. The at least one passenger arrival indication is received from an external device, such as the security scanner device associated with block 1310, or the kiosk associated with block 1332 of FIG. 13A) that is located at the building. Each passenger arrival indication 1322, 1334 indicates that the passengers seeking to enter the building includes a passenger who has arrived at the building and who is ticketed for a transport vehicle (e.g., aircraft) scheduled to depart from the building (e.g., Terminal A). A passenger who is ticketed is distinct from a passenger of an automobile, and from crewmember who works on the transport vehicle.

To determine N, the processing device 102 computes an ETA to a boarding location (e.g., boarding gate associated with the passenger arrival indicator received) from the location of the external device (e.g., kiosk or security scanner device) that sent the passenger arrival indicator. The ETA is an estimated travel time from a location of the external device through the at least one access point of the route to a boarding location inside the building for the transport vehicle.

The processing device 102 increments a count of N on-time passengers for the transport vehicle, based on the passenger arrival indicator received and the computed ETA. For example, as shown at block 1326 of FIG. 13a, processing device 102 increments N if the computed ETA is equal to or prior to the boarding time for that flight ID.

At block 1490, in order to predict whether the transport vehicle will have the delayed departure, the processing device 102 determines an on-time load factor (K/T) corresponding to an on-time departure of the transport vehicle. In some embodiments, the on-time load factor (K/T) can be parameter 1358 including a predetermined value in a range, such as a range of 65% to 85%, inclusively. In another embodiment, as shown at block 1354 of FIG. 13B, the on-time load factor for a particular flight ID can be provided to the system 200 by the airline 210a. Once the on-time load factor is determined (or received), the processing device 102 converts the on-time load factor to K passenger seats of the transport vehicle. For example, the database 132 stores aircraft specific information (including the T total number of seats) for each flight ID.

At block 1490, the processing device 102 predicts that the transport vehicle will have a delayed departure, based on a likelihood that the K passenger seats corresponding to the on-time departure of the transport vehicle will be greater than the count of N on-time passengers at a boarding time. In other words, at a current time, the processing device 102 determines a likelihood that NKK will be the situation at the boarding time for the flight ID that corresponds to the passenger arrival indicator received. In certain embodiments, the processing device 102 sends a recommendation message 1356 (FIG. 13B) to the airline 210a, based on whether on-time load factor (K/T) is satisfied. For example, if the on-time load factor is not satisfied, the processing device 102 sends a recommendation message 1356 notifying that standby passengers should be allowed to fill seats currently reserved for the L late passengers who have an ETA beyond the boarding time. The content of the recommendation message 1356 can be based on the ETA associated with each of the L late passengers, respectively.

Although FIG. 14 illustrates an example method 1400 for predicting traffic flow information based on a selected alternative for redirection of the traffic flow in a physical system, various changes may be made to FIG. 14. For example, while shown as a series of steps, various steps in FIG. 13 could overlap, occur in parallel, occur in a different order, or occur any number of times.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method implemented by at least one processor, the method comprising:

identifying a route for passengers seeking to enter a building at an original destination, the route including:

at least one section of road, within a physical system, for automobiles to access the building; or at least one access point, within the physical system, inside the building for pedestrians to pass through;

receiving, from at least one sensor, traffic flow information corresponding to the route;

determining whether the received traffic flow information corresponds to a condition that impedes the route, from among a set of pre-trained conditions respectively impeding the route, the set of pre-trained conditions within a digital twin of the physical system;

identifying and displaying a list of user-selectable state alternatives for redirection of a traffic flow of multiple vehicles or multiple pedestrians in the physical system, based on a determination that the received traffic flow information corresponds to the condition, the list of user-selectable state alternatives related to the condition that impedes the route;

receiving a selection, from among the list of user-selectable state alternatives, of a selected state alternative; and implementing the selected state alternative in the physical system, wherein the user is a policymaker associated with the physical system.

2. The method of claim 1, further comprising:

receiving user input that includes the selection of the selected state alternative;

obtaining a predicted traffic flow corresponding to the route, based on the selected state alternative; and displaying a user interface that includes the route and visual indicators representing the predicted traffic flow based on the selected state alternative.

3. The method of claim 2, wherein obtaining the predicted traffic flow comprises:

transmitting the selected state alternative to a traffic flow optimizer; and receiving the predicted traffic flow from the traffic flow optimizer, in response to the selected state alternative transmitted.

4. The method of claim 2, wherein:

a first state alternative corresponds to a status quo, from among the list of user-selectable state alternatives;

the selected state alternative is the first state alternative;

obtaining the predicted traffic flow comprises using the received traffic flow information as the predicted traffic flow; and displaying a user interface that includes the route and visual indicators representing the traffic flow information corresponding to the route.

5. The method of claim 1, further comprising:

controlling an output device located along the route to display a predetermined message corresponding to the selected state alternative, wherein the predetermined message is associated with at least one of:

the condition that impedes the route; or a change of mode of transportation.

6. The method of claim 1, further comprising:

receiving, from an external device located at the building, a passenger arrival indication that the passengers seeking to enter the building includes a passenger who has arrived at the building and who is ticketed for a transport vehicle scheduled to depart from the building; and incrementing a count of N on-time passengers for the transport vehicle, based on the passenger arrival indicator received and an estimated travel time from a location of the external device through the at least one access point to a boarding location inside the building for the transport vehicle.

7. The method of claim 6, further comprising:

determining an on-time load factor corresponding to an on-time departure of the transport vehicle;

converting the on-time load factor to K passenger seats of the transport vehicle; and predicting that the transport vehicle will have a delayed departure based on a likelihood that the K passenger seats corresponding to the on-time departure of the transport vehicle will be greater than the count of N on-time passengers at a boarding time, wherein a boarding gate assignment is modified based on the delayed departure predicted.

8. The method of claim 1, wherein a state alternative to change of mode of transportation or a state alternative to redirect to a new destination away from the original destination is among the list of user-selectable state alternatives.

9. An electronic device comprising:

at least one processor configured to:

identify a route for passengers seeking to enter a building at an original destination, the route including:

at least one section of road, within a physical system, for automobiles to access the building; or at least one access point, within a physical system, inside the building for pedestrians to pass through;

receive, from at least one sensor, traffic flow information corresponding to the route;

determine whether the received traffic flow information corresponds to a condition that impedes the route, from among a set of pre-trained conditions respectively impeding the route, the set of pre-trained conditions within a digital twin of the physical system;

identify and display a list of user-selectable state alternatives for redirection of a traffic flow of multiple vehicles or multiple pedestrians in the physical system, based on a determination that the received traffic flow information corresponds to the condition, the list of user-selectable state alternatives related to the condition that impedes the route;

receive a selection, from among the list of user-selectable state alternatives, of a selected state alternative; and implement the selected state alternative in the physical system, wherein the user is a policymaker associated with the physical system.

10. The electronic device of claim 9, wherein the at least one processor is further configured to:

receive user input that includes the selection of the selected state alternative;

obtain a predicted traffic flow corresponding to the route, based on the selected state alternative; and display a user interface that includes the route and visual indicators representing the predicted traffic flow based on the selected state alternative.

11. The electronic device of claim 10, wherein to obtain the predicted traffic flow, the at least one processor is further configured to:

transmit the selected state alternative to a traffic flow optimizer; and receive the predicted traffic flow from the traffic flow optimizer, in response to the selected state alternative transmitted.

12. The electronic device of claim 10, wherein:

a first state alternative corresponds to a status quo, from among the list of user-selectable state alternatives;

the selected state alternative is the first state alternative;

to obtain the predicted traffic flow, the at least one processor is further configured to use the received traffic flow information as the predicted traffic flow; and the at least one processor is further configured to display a user interface that includes the route and visual indicators representing the traffic flow information corresponding to the route.

13. The electronic device of claim 9, wherein the at least one processor is further configured to:

control an output device located along the route to display a predetermined message corresponding to the selected state alternative, wherein the predetermined message is associated with at least one of:
the condition that impedes the route; or
a change of mode of transportation.

14. The electronic device of claim 9, wherein the at least one processor is further configured to:

receive, from an external device located at the building, a passenger arrival indication that the passengers seeking to enter the building includes a passenger who has arrived at the building and who is ticketed for a transport vehicle scheduled to depart from the building; and increment a count of N on-time passengers for the transport vehicle, based on the passenger arrival indicator received and an estimated travel time from a location of the external device through the at least one access point to a boarding location inside the building for the transport vehicle.

15. The electronic device of claim 14, wherein the at least one processor is further configured to:

determine an on-time load factor corresponding to an on-time departure of the transport vehicle;

convert the on-time load factor to K passenger seats of the transport vehicle; and predict that the transport vehicle will have a delayed departure based on a likelihood that the K passenger seats corresponding to the on-time departure of the transport vehicle will be greater than the count of N on-time passengers at a boarding time, wherein a boarding gate assignment is modified based on the delayed departure predicted.

16. A non-transitory computer readable medium embodying a computer program, the computer program comprising computer readable program code that, when executed by a processor of an electronic device, causes the electronic device to:

identify a route for passengers seeking to enter a building at an original destination, the route including:
at least one section of road, within a physical system, for automobiles to access the building; or
at least one access point, within a physical system, inside the building for pedestrians to pass through;

receive, from at least one sensor, traffic flow information corresponding to the route;

determine whether the received traffic flow information corresponds to a condition that impedes the route, from among a set of pre-trained conditions respectively impeding the route, the set of pre-trained conditions within a digital twin of the physical system;

identify and display a list of user-selectable state alternatives for redirection of a traffic flow of multiple vehicles or multiple pedestrians in the physical system, based on a determination that the received traffic flow information corresponds to the condition, the list of user-selectable state alternatives related to the condition that impedes the route;

receive a selection, from among the list of user-selectable state alternatives, of a selected state alternative; and implement the selected state alternative in the physical system, wherein the user is a policymaker associated with the physical system.

17. The non-transitory, computer readable medium of claim 16, wherein the program code that, when executed, causes the electronic device to:

receive user input that includes the selection of the selected state alternative;

obtain a predicted traffic flow corresponding to the route, based on the selected state alternative; and display a user interface that includes the route and visual indicators representing the predicted traffic flow based on the selected state alternative.

18. The non-transitory, computer readable medium of claim 17, wherein the program code that, when executed, causes the electronic device to obtain the predicted traffic flow further comprises program code that, when executed, causes the electronic device to:

transmit the selected state alternative to a traffic flow optimizer; and receive the predicted traffic flow from the traffic flow optimizer, in response to the selected state alternative transmitted.

19. The non-transitory, computer readable medium of claim 17, wherein:

a first state alternative corresponds to a status quo, from among the list of user-selectable state alternatives;

the selected state alternative is the first state alternative;

the program code that, when executed, causes the electronic device to obtain the predicted traffic flow further comprises program code that, when executed, causes the electronic device to use the received traffic flow information as the predicted traffic flow; and the program code that, when executed, causes the electronic device to display a user interface that includes the route and visual indicators representing the traffic flow information corresponding to the route.

20. The non-transitory, computer readable medium of claim 16, wherein the program code that, when executed, causes the electronic device to:

control an output device located along the route to display a predetermined message corresponding to the selected state alternative, wherein the predetermined message is associated with at least one of:
the condition that impedes the route; or
a change of mode of transportation.

21. The non-transitory, computer readable medium of claim 16, wherein the program code that, when executed, causes the electronic device to:

receive, from an external device located at the building, a passenger arrival indication that the passengers seeking to enter the building includes a passenger who has arrived at the building and who is ticketed for a transport vehicle scheduled to depart from the building; and increment a count of N on-time passengers for the transport vehicle, based on the passenger arrival indicator received and an estimated travel time from a location of the external device through the at least one access point to a boarding location inside the building for the transport vehicle.

\* \* \* \* \*